United States Patent
McGowan et al.

(10) Patent No.: US 10,244,562 B2
(45) Date of Patent: Mar. 26, 2019

(54) SIMPLE RACH (SRACH)

(71) Applicant: Telefonaktiebolaget LM Ericsson (publ), Stockholm (SE)

(72) Inventors: Neil McGowan, Stittsville (CA); Marthinus Willem Da Silveira, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/502,382

(22) PCT Filed: Aug. 18, 2014

(86) PCT No.: PCT/IB2014/063958
§ 371 (c)(1),
(2) Date: Feb. 7, 2017

(87) PCT Pub. No.: WO2016/027125
PCT Pub. Date: Feb. 25, 2016

(65) Prior Publication Data
US 2017/0238344 A1 Aug. 17, 2017

(51) Int. Cl.
*H04W 74/08* (2009.01)
*H04L 5/00* (2006.01)

(52) U.S. Cl.
CPC ....... *H04W 74/0833* (2013.01); *H04L 5/0007* (2013.01); *H04L 5/0048* (2013.01)

(58) Field of Classification Search
CPC .............. H04W 74/0833; H04W 74/08; H04L 5/0007; H04L 5/00
(Continued)

(56) References Cited

U.S. PATENT DOCUMENTS 8,077,593 B2 * 12/2011 Iwai ................. H04L 5/0007
370/204
8,098,745 B2 1/2012 Bertrand et al.
(Continued)

FOREIGN PATENT DOCUMENTS

WO 2014119832 A1 8/2014

OTHER PUBLICATIONS

De Figueiredo, Felipe, A. P. et al., "Multi-Stage Based Cross-Correlation Peak Detection for LTE Random Access Preambles," Revista Telecomunicações, vol. 15, Issue 2, Oct. 2013, University of Brasilia Law School, Study Group on Telecommunications Law, pp. 21-27.
(Continued)

*Primary Examiner* — Man U Phan
(74) *Attorney, Agent, or Firm* — Withrow & Terranova, PLLC

(57) ABSTRACT

Systems and methods for providing random access in a cellular communications network are disclosed. In general, the cellular communications network is an Orthogonal Frequency Division Modulation (OFDM) based cellular communications network (e.g., a 3 GPP LTE cellular communications network) or similar multi-subcarrier based cellular communications network. Random access is performed using a Physical Random Access Channel (PRACH) including subcarriers having a subcarrier frequency spacing that is equal to a subcarrier frequency spacing in one or more other channels of the uplink (e.g., a Physical Uplink Shared Channel (PUSCH)). As a result, the subcarriers in the PRACH are orthogonal to the subcarriers in the other channel(s) of the uplink, which in turn reduces, or substantially eliminates, interference between the PRACH subcarriers and the subcarriers of the other channel(s) of the uplink.

23 Claims, 17 Drawing Sheets

(58) Field of Classification Search
USPC .................................................. 370/329–354
See application file for complete search history.

(56) References Cited

U.S. PATENT DOCUMENTS

| | | | | |
|---|---|---|---|---|
| 8,140,083 | B2* | 3/2012 | Fischer | H04L 1/0028 |
| | | | | 455/450 |
| 8,199,778 | B2* | 6/2012 | Shimomura | H04W 74/004 |
| | | | | 370/328 |
| 8,218,496 | B2* | 7/2012 | Bertrand | H04L 27/2633 |
| | | | | 370/329 |
| 8,634,288 | B2* | 1/2014 | McGowan | H04L 27/265 |
| | | | | 370/210 |
| 8,792,377 | B2* | 7/2014 | Bertrand | H04L 1/0007 |
| | | | | 370/252 |
| 9,357,564 | B2* | 5/2016 | Bertrand | H04W 74/004 |
| 9,629,165 | B2* | 4/2017 | Bertrand | H04L 1/0007 |
| 9,781,747 | B2* | 10/2017 | Kim | H04W 74/0833 |
| 9,814,066 | B2* | 11/2017 | Bertrand | H04W 74/004 |
| 2007/0291696 | A1 | 12/2007 | Zhang et al. | |
| 2008/0316961 | A1 | 12/2008 | Bertrand et al. | |
| 2010/0074130 | A1 | 3/2010 | Bertrand et al. | |
| 2012/0307743 | A1 | 12/2012 | McGowan et al. | |

OTHER PUBLICATIONS

Oppermann, Ian et al., "Complex Spreading Sequences with a Wide Range of Correlation Properties," IEEE Transactions on Communications, vol. 45, Issue 3, Mar. 1997, IEEE, pp. 365-375.

Samsung, "R1-072233: RACH Design Parameters," 3rd Generation Partnership Project (3GPP), TSG RAN WG1 Meeting #49, May 7-11, 2007, 5 pages, Kobe, Japan.

International Search Report and Written Opinion for International Patent Application No. PCT/IB2014/063958, dated Apr. 23, 2015, 12 pages.

Examination Report for European Patent Application No. 14759058.2, dated Apr. 5, 2018, 6 pages.

Notification of Reasons of Refusal for Japanese Patent Application No. 2017-509013, dated Dec. 12, 2017, 6 pages.

* cited by examiner

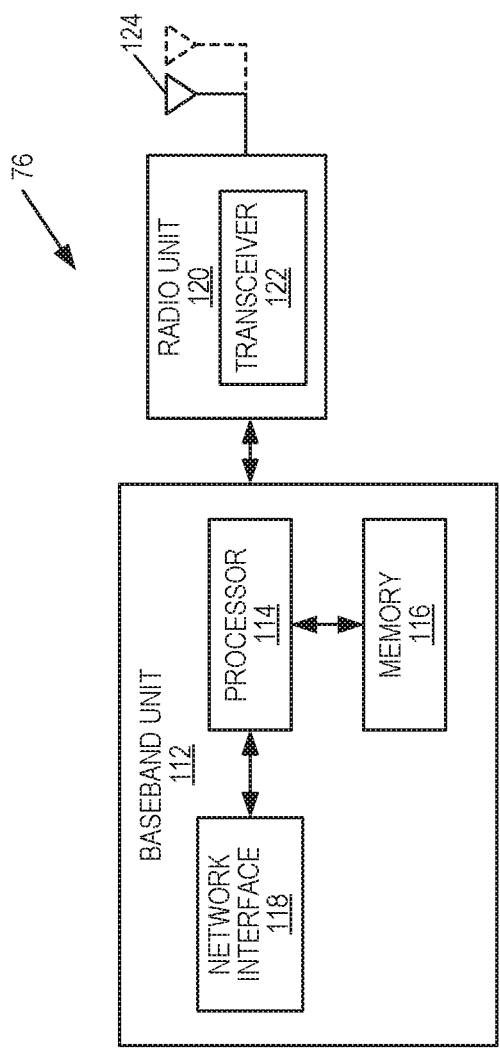
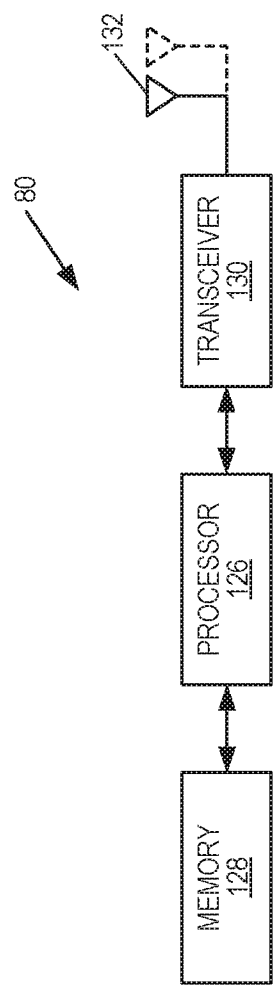

SIMPLE RACH (SRACH)

This application is a 35 U.S.C. § 371 national phase filing of International Application No. PCT/IB2014/063958, filed Aug. 18, 2014, the disclosure of which is incorporated herein by reference in its entirety.

FIELD OF THE DISCLOSURE

The present disclosure relates to random access in a cellular communications network.

BACKGROUND

Random access is a fundamental component of every cellular communications network. In general, random access enables a wireless device, which in the 3$^{rd}$ Generation Partnership Project (3GPP) Long Term Evolution (LTE) standards is referred to as a User Equipment (UE), to request a connection setup. Random access may be used for various purposes including establishing a radio link when initially accessing the cellular communications network, re-establishing a radio link after radio link failure, establishing uplink synchronization for a new cell for handover, etc. As illustrated in FIG. 1, in 3GPP LTE, the random access procedure is performed after first performing a cell search procedure. More specifically, an evolved Node B (eNB) 10 broadcasts Primary and Secondary Synchronization Signals (PSS/SSS) and system information (step 1000). A UE 12 performs a cell search procedure whereby the UE 12 synchronizes to the downlink timing of the cell served by the eNB 10 by detecting the PSS/SSS (step 1002). The UE 12 then obtains, or reads, the system information (step 1004). The system information includes various types of information including information that identifies physical time and frequency resources to be used by the UE 12 for random access.

With respect to the random access procedure, the UE 12 transmits a random access preamble (step 1006). The random access preamble is transmitted on a Random Access Channel (RACH), which is a logical transport channel. The RACH is mapped into a Physical RACH (PRACH), which is provided on time and frequency radio resources indicated by the system information broadcast by the eNB 10. The eNB 10 detects the random access preamble transmitted by the UE 12 and, based on a random access sequence transmitted therein, determines the uplink timing for the UE 12 (step 1008). The eNB 10 then transmits a random access response to the UE 12 including a timing adjustment for the uplink from the UE 12 (step 1010). The UE 12 adjusts its uplink timing according to the timing adjustment received in the random access response (step 1012). The UE 12 and the eNB 10 then use Radio Resource Control (RRC) signaling to exchange information to complete establishment of the radio link between the eNB 10 and the UE 12 (steps 1014 and 1016).

As illustrated in FIG. 2, the random access preamble, which is also referred herein to as a RACH preamble, includes a sequence (referred to herein as a RACH sequence) having a time duration of $T_{SEQ}$, and a Cyclic Prefix (CP) having a time duration of $T_{CP}$. The CP is added to the RACH sequence in order to reduce Inter-Symbol Interference (ISI). The RACH sequence is a $N_{ZC}$-point Zadoff-Chu (ZC) sequence, wherein $N_{ZC}$=839. $N_{ZC}$ is the length of the ZC sequence and thus the length of the RACH sequence. In 3GPP LTE, cell sizes up to approximately 150 kilometers (km) (radius) are supported. In order to provide this support, the time duration of the RACH sequence ($T_{SEQ}$) must be significantly greater than the round-trip time for the largest supported cell size. Specifically, 3GPP LTE defines four random access configurations (Configurations 0-3). For each configuration, the RACH sequence spans one or more 0.8 millisecond (ms) (transmission) cycles. The typical random access configuration is Configuration 0. In Configuration 0, the RACH sequence is a 0.8 ms sequence and, as such, the RACH sequence spans only one 0.8 ms cycle. In particular, in Configuration 0, $T_{SEQ}$=0.8 ms, $T_{CP}$=0.1 ms, and a guard time (not shown) is also equal to 0.1 ms. Configuration 0 allows for cell sizes (radius) of up to 15 km. In order to support even larger cell sizes (i.e., up to 150 km), Configurations 1-3 use longer CPs and, in the case of Configurations 2 and 3, longer sequence lengths (i.e., $T_{SEQ}$=1.6 ms), but over multiple subframes. For example, in Configuration 2, $T_{SEQ}$=1.6 ms, $T_{CP}$=0.2 ms, and the guard time (not shown) is also 0.2 ms. In Configuration 2, the RACH sequence (duration of $T_{SEQ}$=1.6 ms) spans two 0.8 ms cycles. However, each cycle has a duration of 0.8 ms, which corresponds to a subcarrier frequency spacing ($\Delta f_{PRACH}$) for the PRACH subcarriers of 1.25 kilohertz (kHz) (i.e., $\Delta f_{PRACH}$=1/$T_{CYC}$=1/0.8 ms=1.25 kHz, where $T_{CYC}$ is referred to herein as the cycle time).

The PRACH used to transmit the RACH preamble is 6 Resource Blocks (RBs) in the frequency domain. In the time domain, the PRACH is either 1 subframe (1 ms) (Configuration 0), 2 subframes (2 ms) (Configurations 1 or 2), or 3 subframes (3 ms) (Configuration 3). FIG. 3 illustrates the PRACH for Configuration 0. As illustrated, in order to fit the 0.8 ms sequence into 6 RBs in the frequency domain and provide orthogonally between the PRACH subcarriers, the subcarrier frequency spacing ($\Delta f_{PRACH}$) for the PRACH subcarriers is 1.25 kilohertz (kHz) (i.e., $\Delta f_{PRACH}$=1/$T_{CYC}$=1/0.8 ms=1.25 kHz). Thus, as illustrated, the subcarrier frequency spacing ($\Delta f_{PRACH}$) for the PRACH subcarriers is $\frac{1}{12}^{th}$ of the subcarrier frequency spacing ($\Delta f_{TRAFFIC}$) for the subcarriers of the other uplink channels (e.g., Physical Uplink Shared Channel (PUSCH)), which is 15 kHz. There are 864 PRACH subcarriers within the 6 RBs allocated for PRACH. Of these 864 PRACH subcarriers, 839 PRACH subcarriers are used for transmissions of an 839-point ZC sequence.

One issue with the conventional PRACH of 3GPP LTE is that, due to the large number of PRACH subcarriers, processing of the PRACH at both the transmitter and the receiver is complex. In particular, a conventional RACH preamble transmitter 14 is illustrated in FIG. 4. As illustrated, a RACH sequence for the RACH preamble (in the time domain) is input to a Discrete Fourier Transform (DFT) (e.g., Fast Fourier Transform (FFT)) function 16 that performs an $N_{ZC}$-point FFT. Again, for 3GPP LTE, $N_{ZC}$=839. The RACH sequence is an 839-point ZC sequence. The cycle time, or duration, ($T_{CYC}$) of the RACH sequence is 0.8 ms and, as such, the frequency spacing of the frequency bins at the output of the FFT function 16 is 1/$T_{CYC}$=1.25 kHz. A subcarrier mapping function 18 maps the outputs of the FFT function 16 to the appropriate PRACH subcarriers within the uplink system bandwidth.

The outputs of the subcarrier mapping function 18 are provided to corresponding inputs of an Inverse Discrete Fourier Transform (IDFT) (e.g., Inverse FFT (IFFT)) function 20. The size of the IFFT 20 (referred to here as $N_{DFT}$) is $T_{CYC} \cdot f_s$, where $f_s$ is the sampling rate. For a 20 Megahertz (MHz) system bandwidth, 3GPP LTE uses a sampling rate of 30.72 MHz and, as such, the size of the IFFT 20 is 24,576 (i.e., $N_{DFT}$=$T_{CYC} \cdot f_s$=800 microseconds (µs)·30.72 MHz).

The large size of the IFFT 20 leads to a significant amount of resources and complexity when implementing the RACH preamble transmitter 14. A repeat function 22 repeats time domain sequence output by the IFFT 20, if needed, according to the random access configuration. Lastly, a CP insertion function 24 inserts the CP to thereby output the final time domain RACH preamble for transmission.

In the same manner, small RACH subcarrier spacing results in complexity at the conventional RACH preamble receiver. As illustrated in FIG. 5, a conventional apparatus 26 includes a normal traffic path 28 and a RACH path 30, where the RACH path 30 is a conventional RACH preamble receiver. The normal traffic path 28 includes a data processing portion 32, which includes a CP removal function 34, a frequency shift function 36, and a symbol FFT function 38. The CP removal function 34 removes the CP of a receive signal. The frequency shift function 36 then shifts the frequency of the received signal by ½ of the normal subcarrier spacing (i.e., ½·15 kHz=7.5 kHz). The received signal is then divided into time pieces corresponding to a fraction (e.g., 1/14 or 1/12) of a millisecond, where these pieces are referred to as symbols. The symbol FFT function 38 then performs an FFT per symbol. In particular, for a 20 MHz bandwidth, the symbol FFT function 38 performs a 2,048 point FFT per symbol. The resulting frequency domain signal pieces are then provided to an uplink processing function 40 for further signal processing.

For the RACH path 30, a "super FFT" function 42 performs an FFT for 0.8 ms of samples of the received signal. For a 20 MHz bandwidth, the size of the FFT is 24,576. Thus, due to the large size of the FFT, the FFT is referred to herein as a "super FFT." The super FFT function 42 involves a large amount of data to transport and buffer and requires a large amount of computation. The output of the super FFT function 42 is then provided to a data processing portion 44. The data processing portion 44 includes a RACH subcarrier selection function 46, a correlation function 48, and an IFFT function 50. The RACH subcarrier selection function 46 selects the 839 outputs of the super FFT function 42 that correspond to the RACH subcarriers. The correlation function 48 then correlates the output of the RACH subcarrier selection function 46 with known ZC sequences to thereby extract a temporary identifier of the transmitting UE. More specifically, the correlation function 48 performs a multiplication of the received RACH subcarriers with the conjugate of one of the known ZC sequences in the frequency domain. This effectively simultaneously does the correlation at all time shifts of that ZC sequence in one step. The IFFT function 50 then performs a 2,048 point IFFT resulting in a time domain signal that is then processed by a RACH detection module 52. The output of the IFFT function 50 shows where in time any correlation peaks are located. Notably, the correlation (in the frequency domain) and the IFFT are performed once for each of the desired ZC sequences. The super FFT function 42 is a substantial burden in terms of storage space and power, while most of the outputs of the super FFT function 42 are discarded in the data processing portion 44.

U.S. Pat. No. 8,634,288 B2, entitled SYMBOL FFT RACH PROCESSING METHODS AND DEVICES, which was filed on Jun. 1, 2011 and issued on Jan. 21, 2014, describes systems and methods for extracting a RACH preamble without using a super FFT. One embodiment of an apparatus 54 as disclosed in U.S. Pat. No. 8,634,288 B2 is illustrated in FIG. 6. As illustrated, the apparatus 54 includes a device 56 for extracting the RACH preamble from a received signal in a manner that eliminates the need for a super FFT. In particular, the apparatus 54 includes a traffic path and a RACH path. The traffic path is the same as that of FIG. 4. However, the RACH path includes the data processing portion 32 (which is also used for the traffic path), the device 56, the data processing portion 44 for the RACH path, and the RACH detection module 52. Unlike the conventional apparatus 26 of FIG. 4, the apparatus 54 of FIG. 5 uses the data processing portion 32 of the traffic path as part of the RACH path along with the device 56 to eliminate the super FFT function 42. As a result, complexity is substantially reduced.

In particular, for the RACH path, the output of the symbol FFT function 38 for a predetermined number of symbols (e.g., 12) is input into the device 56, one by one. Within the device 56, a de-mapping function 58 selects a portion of the signal where the RACH should be located at that point in time. Due to the coarser FFT (i.e., the FFT performed by the symbol FFT function 38), the selected portion of the signal, which spans about 1 MHz, covers about 72 distinct frequencies in the output spectrum of the symbol FFT. The selected portion of the signal (where all other non-RACH frequency bins have been set to zero) is shifted to baseband.

An IFFT function 60 performs a 256-point IFFT on the selected portion of the signal to thereby transform the selected portion of the signal back to the time domain. A phase adjustment function 62 performs a phase adjustment to compensate for the group delay of the symbol CP gaps when moving the data to baseband (the phase of the first sample of the IFFT output may be zero or another value, which is not necessarily equal to the phase of the signal at the end of the CP time). A CP zero insertion function 64 inserts zeroes into the symbol CP times, and a downsampling function 66 downsamples the signal by a factor of 3. The downsampling occurs to limit the number of points in a sequence corresponding to the RACH preamble to a number of points necessary and relevant (the number of 256 points used in the IFFT function 60 being in excess of 3·72, which is the number of frequencies corresponding to the RACH band after de-mapping, and this number being further increased by the symbol CP insertion). The data processing at functions 58-66 is performed for each of the symbols considered (e.g., the number of symbols may be 12).

The output of the downsampling function 66 is accumulated by an accumulation function 68, and the RACH preamble portion is then selected by a preamble selection function 70. An FFT function 72 then performs a 1,024-point FFT. The frequency spacing of the output bins of the FFT function 72 is 1.25 kHz, and 839 of the output bins of the FFT function 72 correspond to the 839 PRACH subcarriers. The output of the FFT function 72 is then input to the data processing portion 44, where processing proceeds in the manner discussed above. Thus, by using the device 56, the output of the symbol FFT function 38 can be used for RACH extraction. However, since the frequency spacing of the outputs of the symbol FFT function 38 is 15 kHz, the device 56 operates to recover the PRACH subcarriers, which have a 1.25 kHz subcarrier spacing, from the outputs of the symbol FFT function 38, which have a 15 kHz spacing.

The systems and methods of U.S. Pat. No. 8,634,288 B2 provide substantial benefits in terms of reduced complexity. However, both in the conventional RACH receiver used in the apparatus 26 of FIG. 5 and the RACH receiver implemented in the apparatus 54 of FIG. 6, normal traffic (e.g., PUSCH traffic) results in interference during RACH detection and vice versa. As such, there is a need for systems and methods that reduce or eliminate interference between RACH transmissions and normal traffic transmissions.

SUMMARY

Systems and methods relating to random access in a cellular communications network are disclosed. In general, the cellular communications network is an Orthogonal Frequency Division Multiplexing (OFDM) based cellular communications network (e.g., a $3^{rd}$ Generation Partnership Program (3GPP) Long Term Evolution (LTE) cellular communications network) or similar multi-subcarrier based cellular communications network. However, in one embodiment, the cellular communications network is a 3GPP LTE cellular communications network or some derivative thereof. Random access is performed using a Physical Random Access Channel (PRACH) including subcarriers having a subcarrier frequency spacing that is equal to a subcarrier frequency spacing in one or more other channels of the uplink (e.g., a Physical Uplink Shared Channel (PUSCH)). As a result, the subcarriers in the PRACH are orthogonal to the subcarriers in the other channel(s) of the uplink, which in turn reduces, or substantially eliminates, interference between the PRACH subcarriers and the subcarriers of the other channel(s) of the uplink.

In one embodiment, a method of operation of a wireless device to perform random access in a cellular communications network is provided. In one embodiment, the method includes transmitting a RACH preamble on a PRACH in an uplink from the wireless device to a radio access node in the cellular communications network. The PRACH includes subcarriers having a subcarrier frequency spacing that is equal to a subcarrier frequency spacing of one or more other channels of the uplink (e.g., a PUSCH of the uplink). The method further includes receiving a random access response from the radio access node in response to transmitting the RACH preamble.

In one embodiment, the cellular communications network is an OFDM based cellular communications network. In one particular embodiment, the cellular communications network is an LTE cellular communications network.

In one embodiment, the subcarrier frequency spacing of both the subcarriers in the PRACH and subcarriers in the one or more other channels of the uplink is 15 kilohertz (kHz). In another embodiment, the subcarrier frequency spacing of both the subcarriers in the PRACH and subcarriers in the one or more other channels of the uplink is X·15 kHz, where X>1.

In one embodiment, transmitting the RACH preamble includes generating a base RACH sequence for one transmission cycle of a RACH sequence of the RACH preamble, transforming the base RACH sequence from the time domain to the frequency domain to thereby provide a frequency domain representation of the base RACH sequence, mapping the frequency domain representation of the base RACH sequence to an appropriate frequency offset for the PRACH within a system bandwidth of the uplink to thereby provide a mapped frequency domain representation of the base RACH sequence, and transforming the mapped frequency domain representation of the base RACH sequence from the frequency domain to the time domain to thereby provide samples for the RACH sequence of the RACH preamble for one symbol period of the PRACH. The length of the base RACH sequence has a length that is less than or equal to the number of subcarriers in the PRACH. In one embodiment, the samples generated from the base RACH sequence are repeated a total of Q times to provide the RACH sequence, where Q is greater than or equal 1.

In one embodiment, transmitting the RACH preamble further includes repeating the samples for the RACH sequence of the RACH preamble for one or more additional transmission cycles for the RACH sequence of the RACH preamble.

In another embodiment, the number of samples (Z) for the RACH sequence of the RACH preamble provided for the one transmission cycle is defined as the product of a time duration of the base RACH sequence and a system sample rate that is a function of the system bandwidth of the uplink, and transmitting the RACH preamble further includes repeating the Z samples for the RACH sequence of the RACH preamble for Q transmission cycles of the RACH sequence of the RACH preamble, where Q is greater than or equal to 2.

In another embodiment, transmitting the RACH preamble further includes inserting a number of Cyclic Prefix (CP) samples at a start of the samples for the RACH sequence of the RACH preamble for the one transmission cycle of the RACH sequence of the RACH preamble, repeating the samples for the RACH sequence of the RACH preamble for a second transmission cycle of the RACH sequence of the RACH preamble, and inserting a number of CP samples at a start of the samples of the RACH sequence of the RACH preamble for the transmission cycle. The CP samples are not part of the RACH CP but are generated in a process equivalent to what is done with PUSCH symbols such that the CP samples actually form part of the RACH sequence of the RACH preamble.

In one embodiment, the method further includes, while transmitting the RACH preamble, receiving a request from the radio access node for early termination of transmission of the RACH preamble, and terminating transmission of the RACH preamble in response to receiving the request.

In one embodiment, a bandwidth of the PRACH is 1.08 Megahertz (MHz), the subcarrier frequency spacing of both the subcarriers in the PRACH and the subcarriers in the one or more other channels of the uplink is 15 kHz, and the length of the base RACH sequence is less than or equal to 72. In one embodiment, the base RACH sequence is a Zadoff-Chu (ZC) sequence, and the length of the base RACH sequence is 71.

In another embodiment, a bandwidth of the PRACH is X·1.08 MHz, the subcarrier frequency spacing of both the subcarriers in the PRACH and the subcarriers in the one or more other channels of the uplink is X·15 kHz, and the length of the RACH sequence is less than or equal to 72, where X>1. In one embodiment, the RACH sequence is a ZC sequence, and the length of the RACH sequence is 71.

In another embodiment, a bandwidth of the PRACH is X·M·15 kHz, the subcarrier frequency spacing of both the subcarriers in the PRACH and the subcarriers in the one or more other channels of the uplink is X·15 kHz, and the length of the RACH sequence is less than or equal to M, where X>1. In one embodiment, the RACH sequence is a ZC sequence, and the length of the RACH sequence is a largest prime number less than or equal to M.

In another embodiment, a wireless device configured to operate according to any one of the embodiments described above is disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 17 is a block diagram of the base station of FIG. 7 according to one embodiment of the present disclosure; and FIG. 18 is a block diagram of the wireless device of FIG. 7 according to one embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods relating to random access in a cellular communications network are disclosed. In general, the cellular communications network is an Orthogonal Frequency Division Multiplexing (OFDM) based cellular communications network (e.g., a $3^{rd}$ Generation Partnership Program (3GPP) Long Term Evolution (LTE) cellular communications network) or similar multi-subcarrier based cellular communications network. Random access is performed using a Physical Random Access Channel (PRACH) including subcarriers having a subcarrier frequency spacing that is equal to a subcarrier frequency spacing in one or more other uplink channels (e.g., a Physical Uplink Shared Channel (PUSCH)). As a result, the subcarriers in the PRACH are orthogonal to the subcarriers in the other uplink channel(s), which in turn reduces, or substantially eliminates, interference between the PRACH subcarriers and the subcarriers of the other uplink channel(s). Note that the term uplink channel includes uplink signals (e.g., Demodulation Reference Signal (DRS) or Sounding Reference Signal (SRS)). The RACH subcarrier spacing equality can also be with uplink signals, but for simplicity and clarity, the term channels will be used herein.

Figure 7:
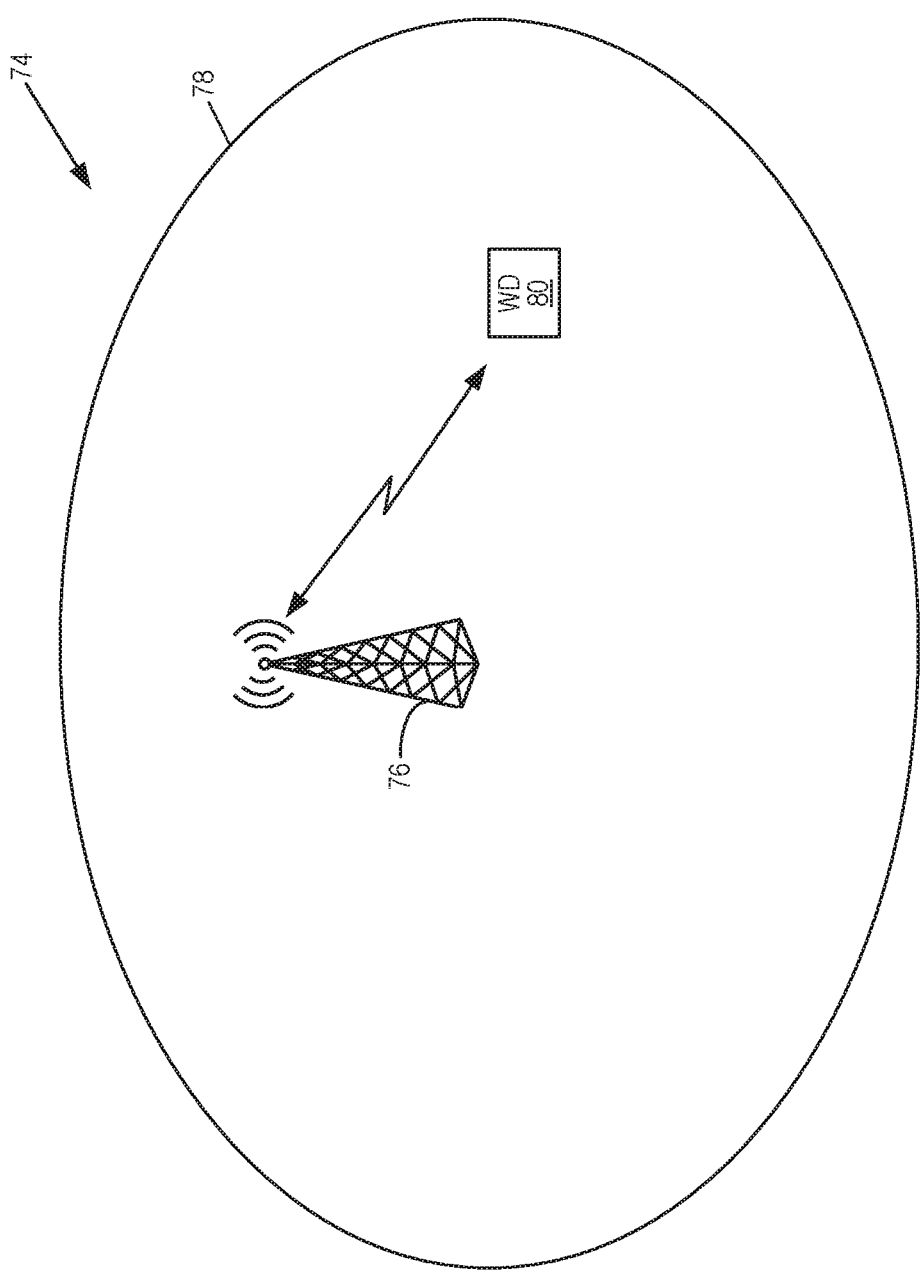
FIG. 7 illustrates a cellular communications network that utilizes a Simple Random Access Channel (SRACH) according to one embodiment of the present disclosure.

In this regard, FIG. 7 illustrates one example of a cellular communications network 74 that utilizes a PRACH for random access according to one embodiment of the present disclosure. Notably, in order to distinguish the PRACH and the Random Access Channel (RACH) disclosed herein from the conventional PRACH and the conventional RACH, the PRACH and RACH disclosed herein are referred to as a Simple PRACH (SPRACH) and a Simple RACH (SRACH) in much of the discussion below. This is done for clarity and ease of discussion only. The term "simple" is not to be construed to mean anything beyond the fact that the subcarrier spacing used for the SPRACH/SRACH disclosed herein is equal to the subcarrier spacing of the other uplink channel(s).

In the embodiments described herein, the cellular communications network 74 is preferably a $4^{th}$ Generation (4G), $5^{th}$ Generation (5G), or some future generation of a 3GPP LTE cellular communications network. As such, 3GPP LTE terminology is oftentimes used herein. However, it should be appreciated that the systems and methods disclosed herein are not limited to 3GPP LTE. Rather, the systems and methods disclosed herein may be used in any OFDM based cellular communications network or any multi-subcarrier based cellular communications network (i.e., not limited to OFDM).

As illustrated, the cellular communications network 74 includes a base station 76 serving a cell 78, and a wireless device 80, which in 3GPP LTE is referred to as a User Equipment (UE). The base station 76 may be a macro, or high power, base station, which in 3GPP LTE is referred to as an evolved Node B (eNB). The base station 76 may alternatively be a low power base station (e.g., a micro, pico, femto, or home eNB). Note that while the base station 76 is used in the embodiments described below, the embodiments are equally applicable to any radio access node that processes random access preamble transmissions.

The wireless device 80 performs random access for various purposes including, for example, establishing a radio link when initially accessing the cellular communications network 74, re-establishing a radio link with the base station 76 after radio link failure, establishing uplink synchronization with the cell 78 served by the base station 76 for handover, etc. During random access, the wireless device 80 transmits a SRACH preamble on the SPRACH. In conventional 3GPP LTE networks, in order to support large cell sizes (i.e., greater than 15 kilometer (km) radius and up to about 150 km radius), the conventional RACH preamble includes a Zadoff-Chu (ZC) sequence transmitted over one or more 0.8 millisecond (ms) cycles (i.e., $T_{CYC}$=0.8 ms). A length of the ZC sequence for one cycle is referred to as $N_{ZC}$. For the most common RACH configuration (Configuration 0), RACH preamble includes a $N_{ZC}$-point ZC sequence transmitted on one cycle, where $N_{ZC}$ is equal to 839 (i.e., a length of the ZC sequence is 839) and a time duration of the ZC sequence is 0.8 ms (i.e., time duration is equal to $T_{CYC}$=0.8 ms). In order to maintain orthogonally between the subcarriers within the conventional PRACH, which are referred to herein as the PRACH subcarriers, the subcarrier frequency spacing within the conventional PRACH is 1.25 kilohertz (kHz)

$$\left( \text{i.e., } \frac{1}{T_{CYC}} = \frac{1}{0.8 \text{ ms}} = 1.25 \text{ kHz} \right).$$

However, while the 1.25 kHz subcarrier frequency spacing maintains orthogonally between the conventional PRACH subcarriers, the 1.25 kHz PRACH subcarrier frequency spacing is different than the 15 kHz subcarrier spacing for other uplink channels (e.g., PUSCH). Therefore, the conventional PRACH subcarriers are not orthogonal to the subcarriers for the other uplink channels (e.g., the PUSCH subcarriers). As a result, a conventional PRACH transmission from one wireless device causes interference to, e.g., PUSCH transmission(s) from another wireless device(s), and vice versa.

In contrast, the SPRACH uses a subcarrier spacing ($\Delta f_{SPRACH}$) that is equal to the subcarrier spacing ($\Delta f_{TRAFFIC}$) of the other uplink channel(s) (e.g., PUSCH), which are sometimes referred to herein as normal traffic channels. Using 3GPP LTE as an example, $\Delta f_{SPRACH} = \Delta f_{TRAFFIC} = 15$ kHz. By using the same subcarrier frequency spacing for both the SPRACH and the other uplink channel(s), the SPRACH subcarriers are orthogonal to the subcarriers of the other uplink channel(s) (e.g., PUSCH), which in turn substantially eliminates, if not entirely eliminates, interference between SRACH preamble transmissions and uplink traffic transmissions.

Like the conventional RACH preamble, the SRACH preamble includes a Cyclic Prefix (CP) having a time duration of $T_{CP}$ and a sequence (e.g., a ZC sequence) having a time duration of $T_{SEQ}$. The sequence for the SRACH preamble is referred to herein as the SRACH sequence. The SRACH sequence includes one or more repetitions of the same SRACH sequence, which is referred to herein as a base SRACH sequence. Unlike the conventional RACH preamble of 3GPP LTE that has a cycle time, or duration, (e.g., 0.8 ms for 3GPP LTE) that is much greater than one normal traffic symbol time (e.g., 66.7 microseconds (µs) for 3GPP LTE), the SRACH preamble has a cycle time, or duration, ($T_{CYC}$) that is equal to one normal traffic symbol time. Thus, using 3GPP LTE as an example, the SRACH has a cycle time ($T_{CYC}$) that is equal to $\frac{1}{15}$ kHz=66.7 µs. In other words, the base SRACH sequence has a duration equal to $T_{CYC}$, which is itself equal to the normal traffic symbol time.

In one embodiment, the SRACH preamble includes one instance of the SRACH cycle in the time domain and some defined number of Resource Blocks (RBs) in the frequency domain (e.g., 6 RBs for 3GPP LTE). In other embodiments, the SRACH preamble includes multiple repetitions of the SRACH cycle and may span multiple subframes (e.g., 2 or 3 subframes as in 3GPP LTE random access Configurations 1-3). The repetitions enable transmission of multiple repetitions of the base SRACH sequence, which increases sensitivity and time discrimination upon reception at the base station 76.

Notably, the shorter length of the SRACH cycle as compared to the conventional RACH cycle means that the size of the cell 78 is limited to smaller sizes than that supported using the conventional RACH preamble. For example, by reducing the length of SRACH cycle to 66.7 µs in a 3GPP LTE network, the size of the cell 78 is limited to 10 km. Specifically, the unambiguous cell radius over which the SRACH preamble can be used is 0.5·300·66.7/X meters, where X=1 for 3GPP LTE, X>1 for a scaled frequency version of 3GPP LTE, 300 is the electromagnetic propagation speed in meters per microsecond, and the factor 0.5 accounts for transmission time in both directions. Thus, the maximum cell size for X=1 is 10 km, and the maximum cell size for, e.g., X=10 is 1 km. The smaller cell size is not seen as an issue, particularly for new and future generations of LTE (and other types of cellular communications networks). New and future generations of LTE use or plan to use smaller cell sizes. For example, heterogeneous network deployments may be used, where the heterogeneous network may include many small, low-power cells. Small cell sizes are also particularly likely for future 5G networks, which are expected to use dense deployments of small base stations in order to support high traffic loads (e.g., in cities).

Figure 8:
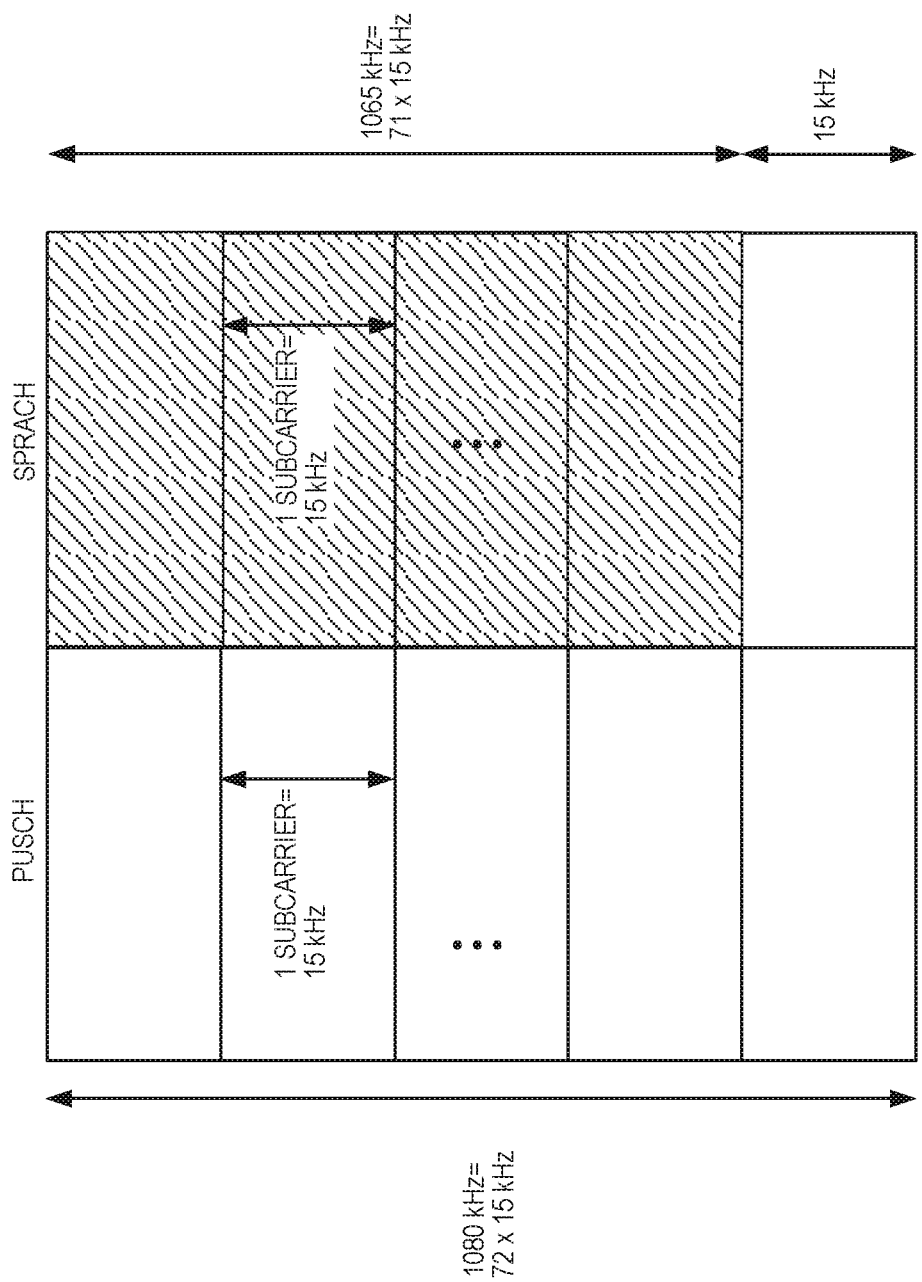
FIG. 8 illustrates subcarrier frequency spacing for one example of a Simple Physical Random Access Channel (SPRACH) relative to that of other uplink traffic channels according to one embodiment of the present disclosure.

FIG. 8 is a frequency domain representation of the SPRACH according to one embodiment of the present disclosure. This example is for 3GPP LTE. However, again, the present disclosure is not limited thereto. In this example, the subcarrier frequency spacing ($\Delta f_{SPRACH}$) of the SPRACH subcarriers is 15 kHz, which is equal to the subcarrier frequency spacing ($\Delta f_{PUSCH}$) of the PUSCH subcarriers. Further, in this example, the SPRACH spans 6 RBs in the frequency domain, where each RB includes 12 subcarriers. Thus, the SPRACH consists of 72 SPRACH subcarriers (i.e., 6 RBs·12 SPRACH subcarriers per RB=72 SPRACH subcarriers) and spans a total bandwidth of 1.08 MHz (i.e., 72 SPRACH subcarriers·15 kHz per SPRACH subcarrier=1.08 MHz). In this example, the base SRACH sequence is a 71-point ZC sequence (i.e., $N_{ZC}$=71). Note, however, that other types of sequences may be used, as will be appreciated by one of ordinary skill in the art. Since a 71, rather than a 72, point sequence is used, one of the SPRACH subcarriers is unused.

Figure 9:
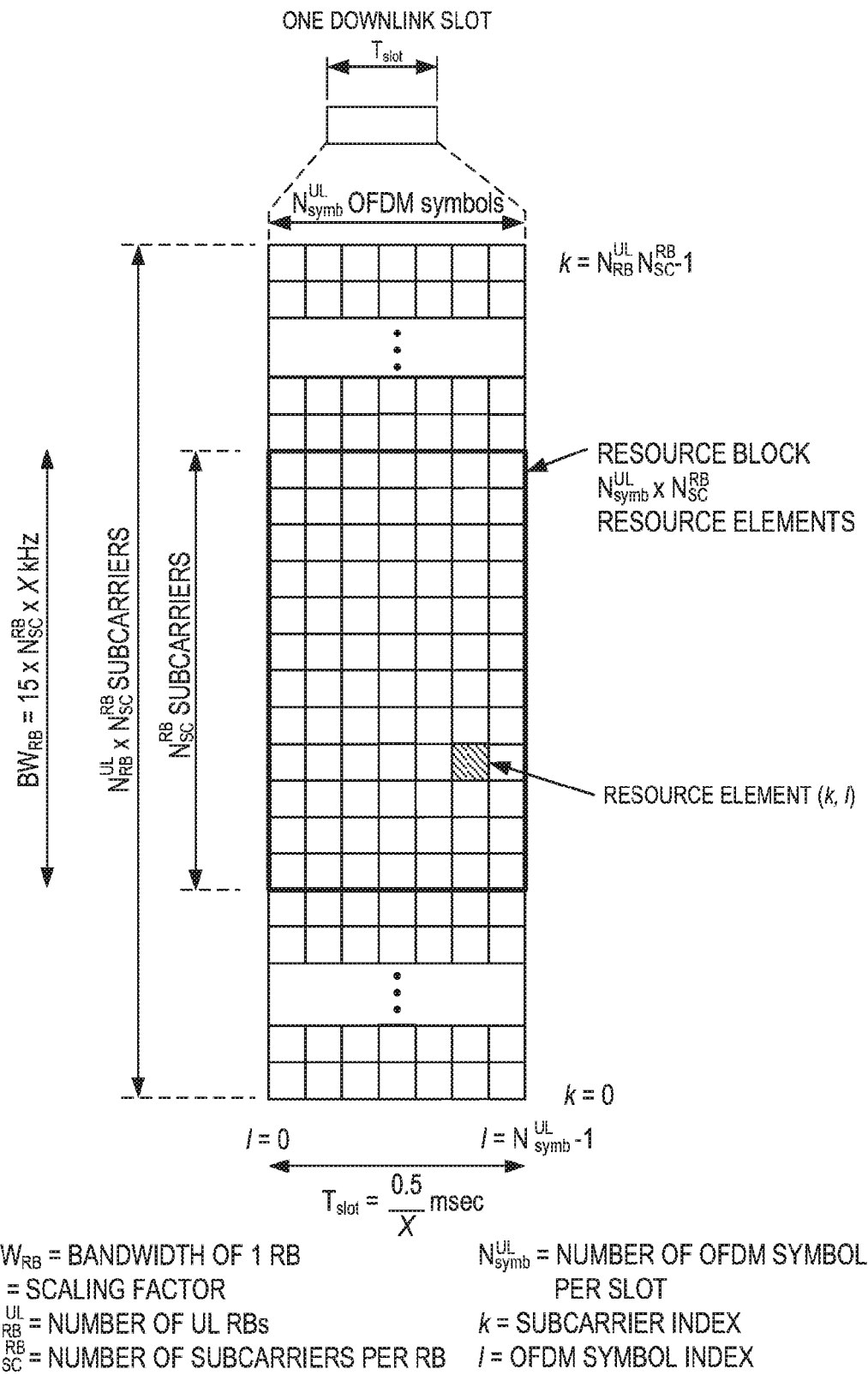
FIG. 9 illustrates one slot of an uplink subframe for a scaled frequency cellular communications network.
Figure 10:
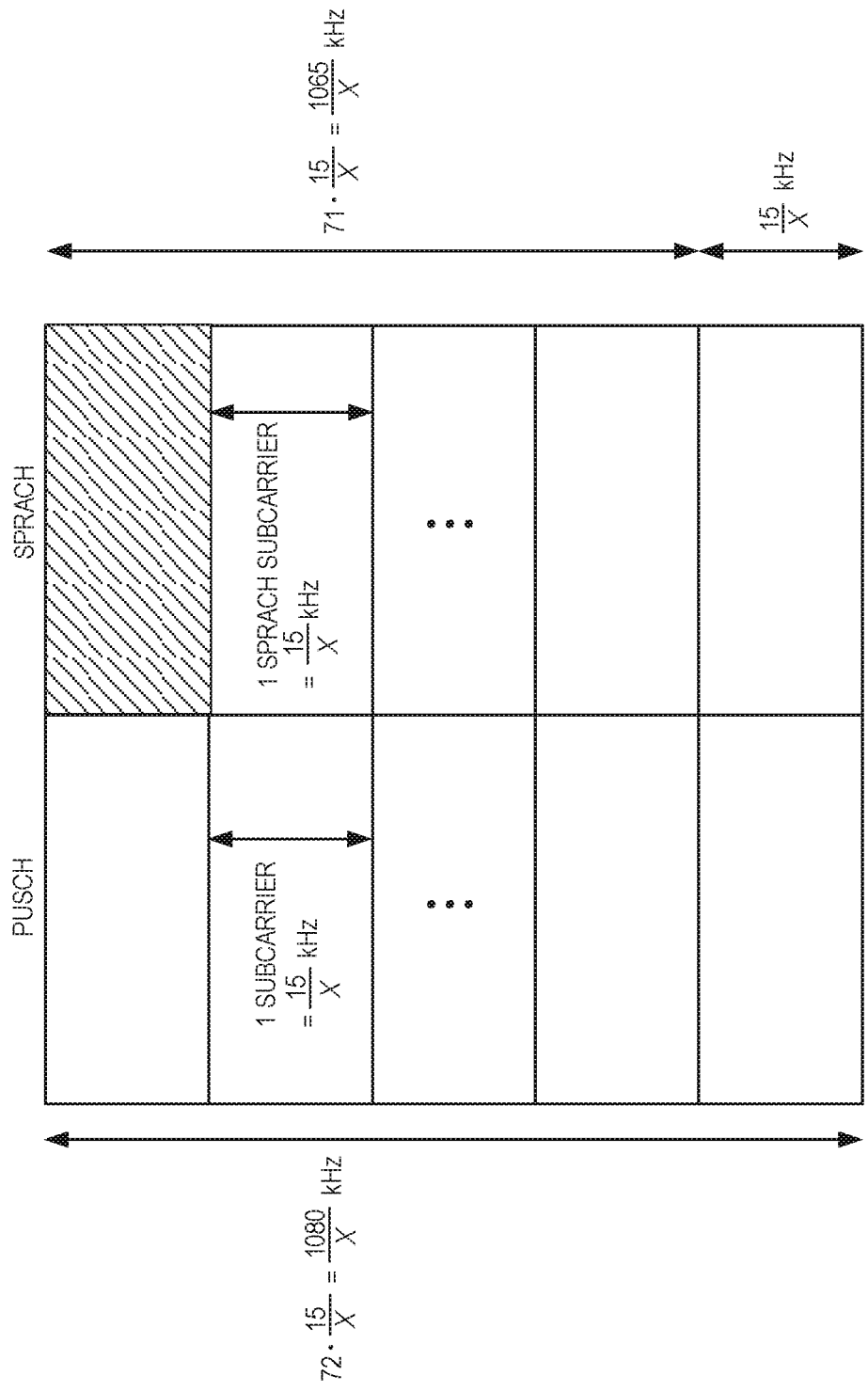
FIG. 10 illustrates subcarrier frequency spacing for one example of a SPRACH relative to that of other uplink traffic channels in a scaled frequency cellular communications network according to one embodiment of the present disclosure.

Importantly, the embodiment of FIG. 8 is only an example. For instance, future generations of the 3GPP LTE network or other OFDM based cellular networks may allocate more or less than 6 RBs to the SPRACH channel in the frequency domain. As another example, a subcarrier frequency spacing other than 15 kHz may be used. Further, the SPRACH channel and SRACH preamble may be used in a scaled frequency cellular communications network (e.g., a scaled frequency LTE network) where frequency is multiplied by a scaling factor X (e.g., the SPRACH subcarrier spacing is equal to 15 kHz·X) and time is divided by the scaling factor X (e.g., the length of the SRACH cycle is equal to 66.7 μs/X). For example, for a for a 20 Gigahertz (GHz) carrier, the scaling factor X may be, e.g., 10. This is illustrated in FIGS. 9 and 10, where FIG. 9 illustrates one slot of the uplink frame structure in the scaled frequency network and FIG. 10 illustrates the SPRACH in the scaled frequency network. Notably, in one embodiment, the SPRACH in the scaled frequency network has a bandwidth of X·M·15 kHz and a subcarrier frequency spacing of X·15 kHz (which is equal to the subcarrier frequency spacing of the other uplink channel(s)), and the length of the base SRACH sequence is less than or equal to M, where M is the number of SPRACH subcarriers (M>1) and X is the scaling factor (X>1). Note that M=72 and X=1 is one embodiment of the SPRACH in a 3GPP LTE network. In one embodiment, the base SRACH sequence is a $N_{ZC}$-point ZC sequence, where $N_{ZC}$ is the largest prime number less than or equal to M.

Figure 11:
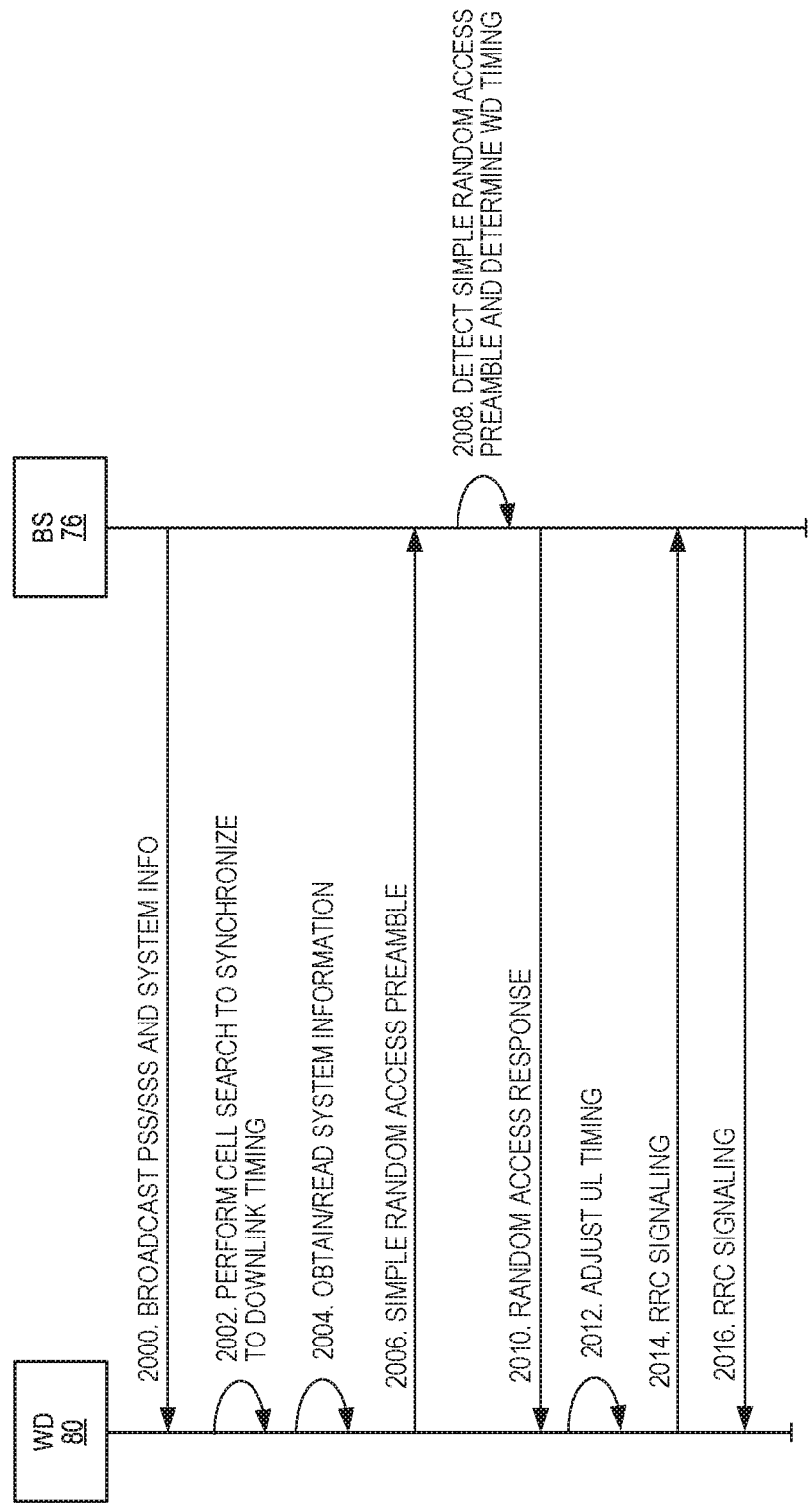
FIG. 11 illustrates a cell search and random access procedure utilizing a SRACH preamble transmitted on a SPRACH according to one embodiment of the present disclosure.

FIG. 11 illustrates a cell search and random access procedure with respect to the cellular communications network 74 of FIG. 7 according to one embodiment of the present disclose. Note that while FIG. 11 and some other figures illustrate "steps," it should be noted that the term "steps" is not to be construed as requiring any particular ordering for the performance of the associated actions. In fact, the steps may be performed in any desired order unless a specific order is explicitly stated as being required or a specific ordering is otherwise required for operation. Further, some of the steps may be performed simultaneously.

As illustrated, the base station 76 broadcasts Primary and Secondary Synchronization Signals (PSS/SSS) and system information (step 2000). The wireless device 80 performs a cell search procedure whereby the wireless device 80 detects the PSS/SSS and thereby synchronizes to the downlink timing of the cell 78 (step 2002). The wireless device 80 then obtains, or reads, the system information (step 2004). The system information includes various types of information including information that identifies physical time and frequency resources to be used by the wireless device 80 for random access. More specifically, the system information includes information that identifies the resources to be used for SRACH preamble transmission (i.e., identifies the SPRACH).

The wireless device 80 then transmits a SRACH preamble (step 2006). The SRACH preamble is transmitted on a SRACH, which is a logical channel that is mapped to the SPRACH. The base station 76 detects the SRACH preamble transmitted by the wireless device 80 and determines the uplink timing for the wireless device 80 (step 2008). From this point, the procedure proceeds in the conventional manner. Specifically, the base station 76 transmits a random access response to the wireless device 80 including a timing adjustment for the uplink from the wireless device 80 (step 2010). The wireless device 80 then adjusts its uplink timing according to the random access response (step 2012). The wireless device 80 and the base station 76 then use Radio Resource Control (RRC) signaling to exchange information to complete establishment of the radio link between the base station 76 and the wireless device 80 (steps 2014 and 2016).

Figure 12:
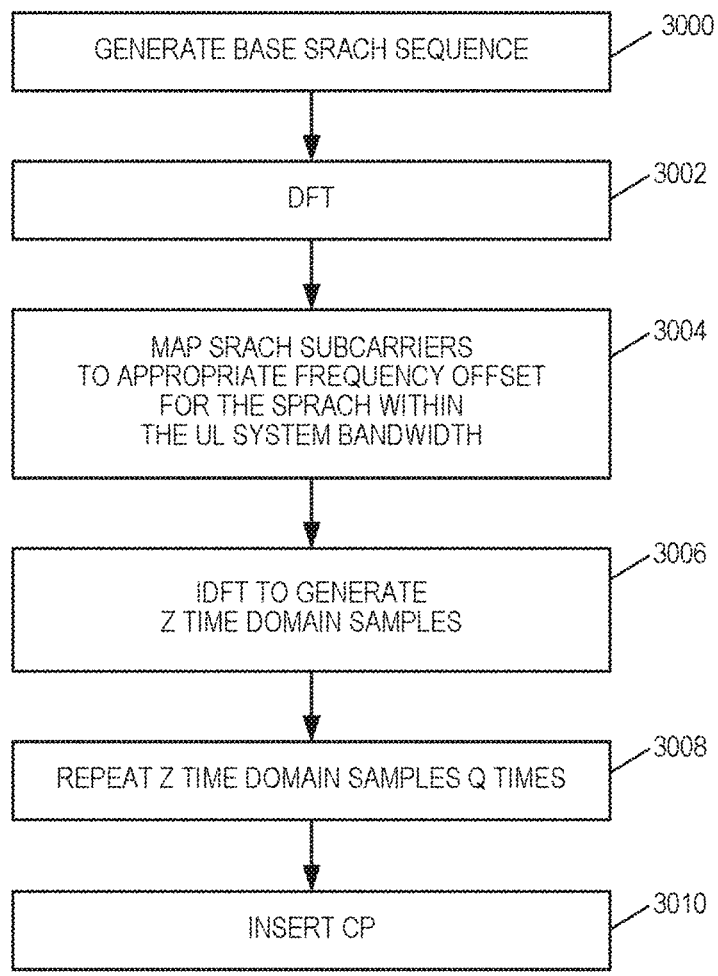
FIG. 12 illustrates a process for generating a SRACH preamble according to one embodiment of the present disclosure.

FIG. 12 illustrates a process for generating a SRACH preamble to be transmitted by the wireless device 80 according to one embodiment of the present disclosure. This process is performed by the wireless device 80. First, a base SRACH sequence is generated in the time domain (step 3000). Note, however, that the base SRACH sequence may alternatively be generated in the frequency domain, in which case step 3002 may be skipped. The base SRACH sequence consists of $N_{ZC}$ complex values of a ZC sequence or other sequence having good cross-correlation, auto-correlation, and frequency domain properties. While not essential, in one alternative embodiment, the base SRACH sequence is a sequence as disclosed in Ian Oppermann et al., "Complex Spreading Sequences with a Wide Range of Correlation Properties," IEEE Transactions on Communications, Vol. 45, No. 3, March 1997, pages 365-375, which is hereby incorporated herein by reference for its teachings on suitable sequences for the base SRACH sequence. For inter-working with the existing 3GPP LTE standards, the base SPRACH may be, in one embodiment, 6 RBs (i.e., 72 SPRACH subcarriers) in the frequency domain and have a subcarrier spacing of 15 kHz. In this case, $N_{ZC}$ (or more generally the number of complex values in the time domain base SRACH sequence) is 71. Note that, particularly for ZC sequences, a prime number of complex values for the sequence is preferred.

A Discrete Fourier Transform (DFT) (e.g., a Fast Fourier Transform (FFT)) is then performed on the time domain base SRACH sequence to thereby transform the time domain base SRACH sequence into a frequency domain representation of the base SRACH sequence (step 3002). The number of points in the FFT is preferably equal to the number of complex values in the time domain base SRACH sequence. Thus, for example, if the base SRACH sequence is a $N_{ZC}$-point ZC sequence, then the number of points in the FFT is equal to $N_{ZC}$. The frequency spacing of the output frequency bins of the FFT are equal to $1/T_{CYC}$, where $T_{CYC}$ is the length, or time duration, of one cycle of the base SRACH sequence. Here, $T_{CYC}$ is equal to the symbol length for other uplink traffic channels and, as such, the frequency spacing of the output frequency bins of the FFT (and thus the SPRACH subcarrier frequency spacing) is equal to the subcarrier frequency spacing of the other uplink channels. In one embodiment, $T_{CYC}$=66.7 μs and $N_{ZC}$=71. As such, the FFT is a 71-point FFT, and the frequency spacing of the output frequency bins of the FFT are equal to 15 kHz (i.e., 1/0.0667 ms=15 kHz), which matches the desired subcarrier frequency spacing for other 3GPP LTE channels.

The outputs of the DFT, which are the SPRACH subcarriers, are then mapped to the appropriate frequency offset for the SPRACH within the uplink (step 3004). More specifically, there are L subcarriers for the uplink, where L is a function of the bandwidth of the uplink. In 3GPP LTE and a frequency scaled version of 3GPP LTE, L=1200·BW/(20·X). The SPRACH subcarriers output by the DFT are mapped to the appropriate set of subcarriers (i.e., the subcarriers allocated for PRACH) within the L subcarriers of the uplink.

Importantly, the length of the time domain base SRACH sequence (i.e., the cycle time $T_{CYC}$) is selected such that the frequency spacing between the output bins of the FFT, and thus the SPRACH subcarrier frequency spacing, is equal to the subcarrier frequency spacing of the other uplink channels (e.g., PUSCH, Physical Uplink Control Channel (PUCCH), etc.). Therefore, the SPRACH subcarriers will be orthogonal to the subcarriers of the other uplink channels at the base station 76. This orthogonality to the subcarriers of the other uplink channels reduces, if not eliminates the need for a guard band at the outer edges of the SPRACH in the frequency domain. Such guard bands are required for the conventional 3GPP LTE PRACH. The elimination of the guard bands may be possible as there is no leakage between data/control subcarriers and the SPRACH subcarriers. In addition, the orthogonality of the SPRACH subcarriers will give improved Signal-to-Interference plus Noise Ratio (SINR) and system performance.

After mapping, a Z-point Inverse Discrete Fourier Transform (IDFT) (e.g., a Z-point Inverse Fast Fourier Transform (IFFT)) is performed on the frequency domain samples to thereby transform the frequency domain samples into Z time domain samples (step 3006). The value of Z depends on the sampling rate. Specifically, $Z=T_{CYC} \cdot f_s$, where $f_s$ is the sampling rate. For example, in 3GPP LTE, the sampling rate when using a 20 Megahertz (MHz) bandwidth is 30.72 Megasamples per second (Msps). Thus, for $T_{CYC}=66.7$ μs and $f_s=30.72$ Msps, Z is equal to 2,048. The output of the IDFT is a $T_{CYC}$ length time domain representation of the OFDM modulated base PRACH sequence at the appropriate SPRACH subcarrier frequencies, where the PRACH subcarrier frequency spacing is equal to that of the other uplink channels.

In this embodiment, the Z time domain samples output by the IDFT may optionally be repeated to provide a total of Q repetitions of the base SRACH sequence to thereby provide the final SRACH sequence (step 3008). In other words, in this embodiment, the SRACH sequence of the SRACH preamble is Q repetitions of the base SRACH sequence, where Q is greater than or equal to 1. Using multiple repetitions improves sensitively (e.g., SINR) and time discrimination (e.g., time resolution) after SRACH processing at the base station 76. For example, if Q=12 and $T_{CYC}=66.7$ μs, the total length of all of the repetitions of the base SRACH sequence is approximately 0.8 ms, which is equivalent to the length of the conventional RACH sequence for 3GPP LTE Configuration 0. In one embodiment, Q=X·12, where X=1 for 3GPP LTE and X>1 for a frequency scaled version of 3GPP LTE. Using repetition, the SRACH sequence of the SRACH preamble is generated continuously for Z·Q samples and can be extracted effectively at the base station 76. Lastly, a CP is inserted at the start of the Q repetitions of the base SRACH sequence to thereby provide the SRACH preamble for transmission (step 3010).

In one embodiment, the time domain SRACH preamble s(t) is defined as:

$$s(t) = \beta_{PRACH} + \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{SPRACH}(t-T_{CP})}$$

for $0 \le t \le Q \cdot T_{CYC}+T_{CP}$, $\beta_{PRACH}$ is an amplitude scaling factor in order to confirm to the transmit power for the SPRACH ($P_{SPRACH}$) which may be set according to, e.g., existing procedures for setting the power of the conventional PRACH, $x_{u,v}(n)$ is the v-th cyclic shift of the u-th root ZC sequence (as per or similar to 3GPP LTE standards), $\varphi$ is a fixed offset relative to the physical RB boundary in $\Delta f_{SPRACH}$ resolution (e.g., 0 or 1), K is equal to 1 for SRACH, $T_{CP}$ is the length of the CP of the SRACH preamble, and $k_0$ is defined as:

$$k_0 = n_{PRB}^{RA} N_{sc}^{RB} - N_{RB}^{UL} N_{sc}^{RB}/2,$$

where the parameter $n_{PRB}^{RA}$ controls the location in the frequency domain, $N_{sc}^{RB}$ is the number of subcarriers per RB, and $N_{RB}^{UL}$ is the number of RBs in the uplink. Further, the u-th root ZC sequence is defined as:

$$x_u(n) = e^{-j\frac{\pi un(n+1)}{N_{ZC}}},$$

for $0 \le n \le N_{ZC}-1$, where u is the ZC physical root sequence index. The SRACH subcarrier frequency spacing ($\Delta f_{SPRACH}$) is, in one embodiment, equal to some value $\Delta f$ in a non-frequency scaled network (e.g., $\Delta f_{SPRACH}=\Delta f=15$ kHz in a 3GPP LTE network), where $\Delta f$ is equal to the subcarrier spacing of the other uplink channel(s). In another embodiment, the SRACH subcarrier frequency spacing ($\Delta f_{SPRACH}$) is equal to $X \cdot \Delta f$ in a frequency scaled network (e.g., $\Delta f_{SPRACH}=X \cdot \Delta f=10 \cdot 15$ kHz=150 kHz for a frequency scaled version of a 3GPP LTE network having a scaling factor (X) of 10), where $X \cdot \Delta f$ is the subcarrier spacing of the other uplink channels in the frequency scaled network. Notably, the value K is equal to $\Delta f/\Delta f_{SPRACH}=1$ for a non-frequency scaled network and equal to $X \cdot \Delta f/\Delta f_{SPRACH}=1$ for a frequency scaled network. In either case, K=1 such that equality of the subcarrier spacing between the SPRACH and the other uplink channel(s) is achieved.

Figure 13:
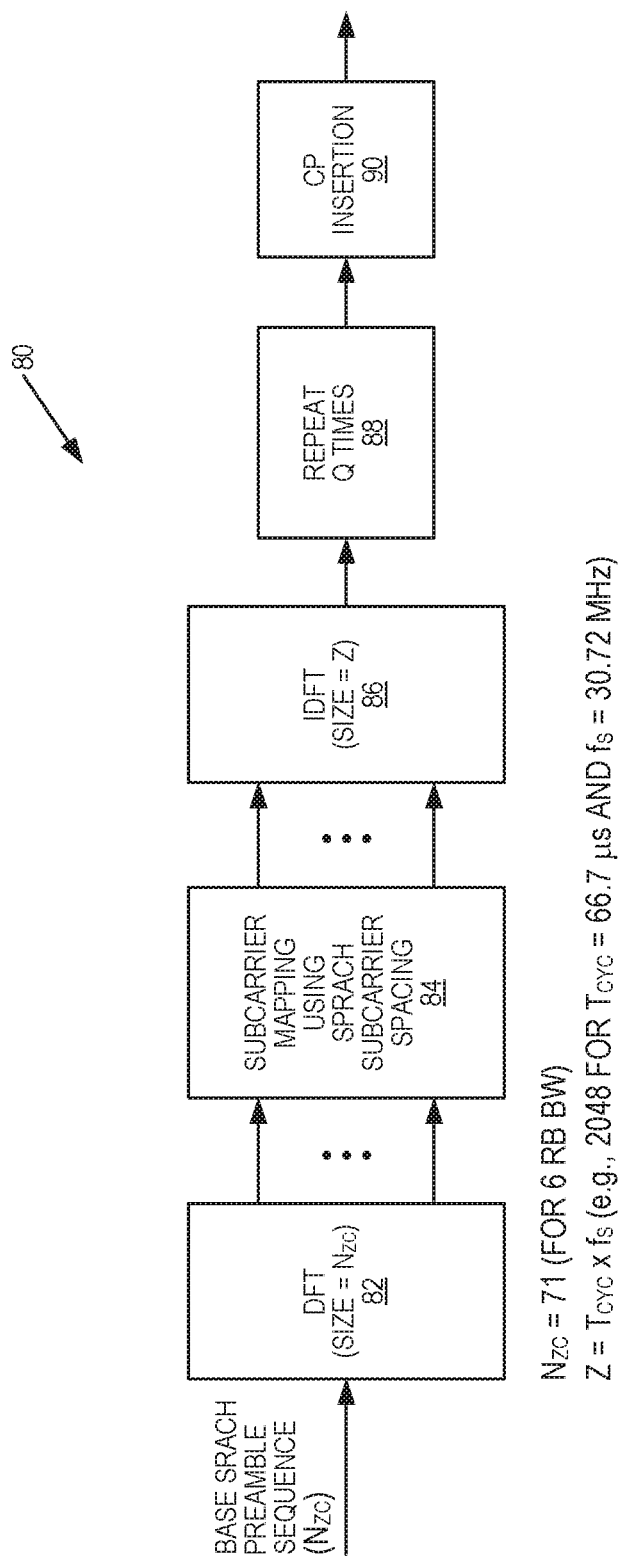
FIG. 13 is a block diagram of the wireless device of FIG. 7, where the wireless device operates to generate a SRACH preamble according to the process of FIG. 12 according to one embodiment of the present disclosure.

FIG. 13 is a block diagram of the wireless device 80 that operates to generate the SRACH preamble according to the process of FIG. 12 according to one embodiment of the present disclosure. Notably, FIG. 13 only illustrates a portion of the wireless device 80 that operates to generate the SRACH preamble. The wireless device 80 includes other components that are not illustrated in FIG. 13. The blocks illustrated in FIG. 13 may be implemented in hardware or a combination of software and hardware. As illustrated, the wireless device 80 includes a DFT function 82 that operates to perform a DFT of the time domain base SRACH sequence. As discussed above, the length ($T_{CYC}$) of the time domain base SRACH sequence is such that the frequency spacing of the output frequency bins (which is $1/T_{CYC}$) is equal to the desired SPRACH subcarrier frequency spacing, where the desired SPRACH subcarrier frequency spacing is equal to the subcarrier frequency spacing of the other uplink channels. A subcarrier mapping function 84 maps the outputs of the DFT to the appropriate SPRACH subcarriers. An IDFT function 86 then performs an IDFT of the outputs of the subcarrier mapping function 84 to provide Z time domain samples, as discussed above. A repeat function 88 then repeats the Z time domain samples for a total of Q times. Lastly, a CP insertion function 90 inserts the CP to complete the SRACH preamble. Note that the functions 82 through 90 may be implemented in hardware or a combination of hardware and software.

Figure 14:
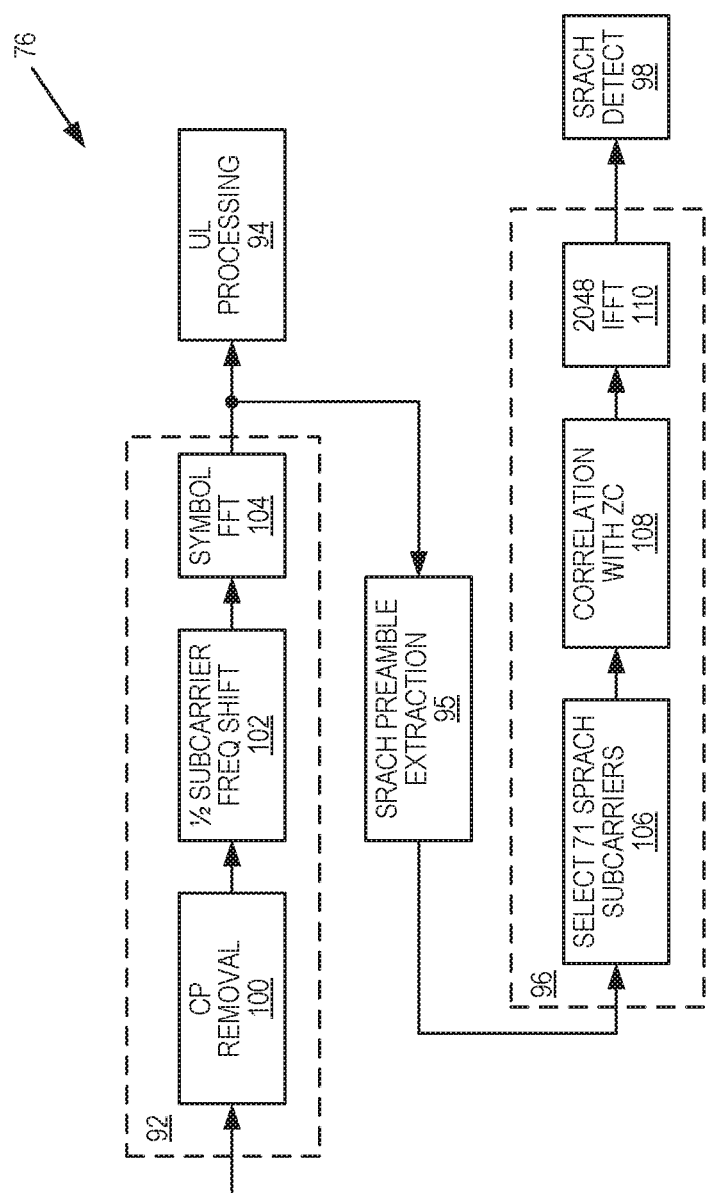
FIG. 14 is a block diagram of the base station of FIG. 7, where the base station operates to detect a SRACH preamble generated and transmitted by the wireless device according to one embodiment of the present disclosure.

FIG. 14 illustrates one embodiment of the base station 76 in which the base station 76 operates to detect a SRACH sequence transmitted by the wireless device 80 according to one embodiment of the present disclosure. Note that, as will be appreciated by one of ordinary skill in the art, the base station 76 includes other components that are not illustrated in FIG. 14. As illustrated, the base station 76 includes a normal traffic path formed by a data processing portion 92 and an uplink processing function 94, and a SRACH path formed by the data processing function 92, a SRACH preamble extraction function 95, a data processing function 96, and a SRACH detection function 98. The data processing function 92 includes a CP removal function 100, a frequency shift function 102, and a symbol FFT function 104. The frequency shift function 102 may not be included in some embodiments. The CP removal function 100 removes the CP of a received signal. The frequency shift function 102 then shifts the frequency of the received signal by ½ of the normal subcarrier spacing (e.g., ½·15 kHz=7.5 kHz for 3GPP LTE). The received signal is then divided into time pieces corresponding to a fraction (e.g., 1/14 or 1/12) of a subframe (which for 3GPP LTE is 1 ms), where these pieces are referred to as symbols. The symbol FFT function 104 then performs an FFT per symbol using, for a 20 MHz 3GPP LTE bandwidth, a 2,048 point FFT per symbol. The resulting frequency domain signal pieces are then provided to the uplink processing function 94 for further signal processing.

Figure 1:
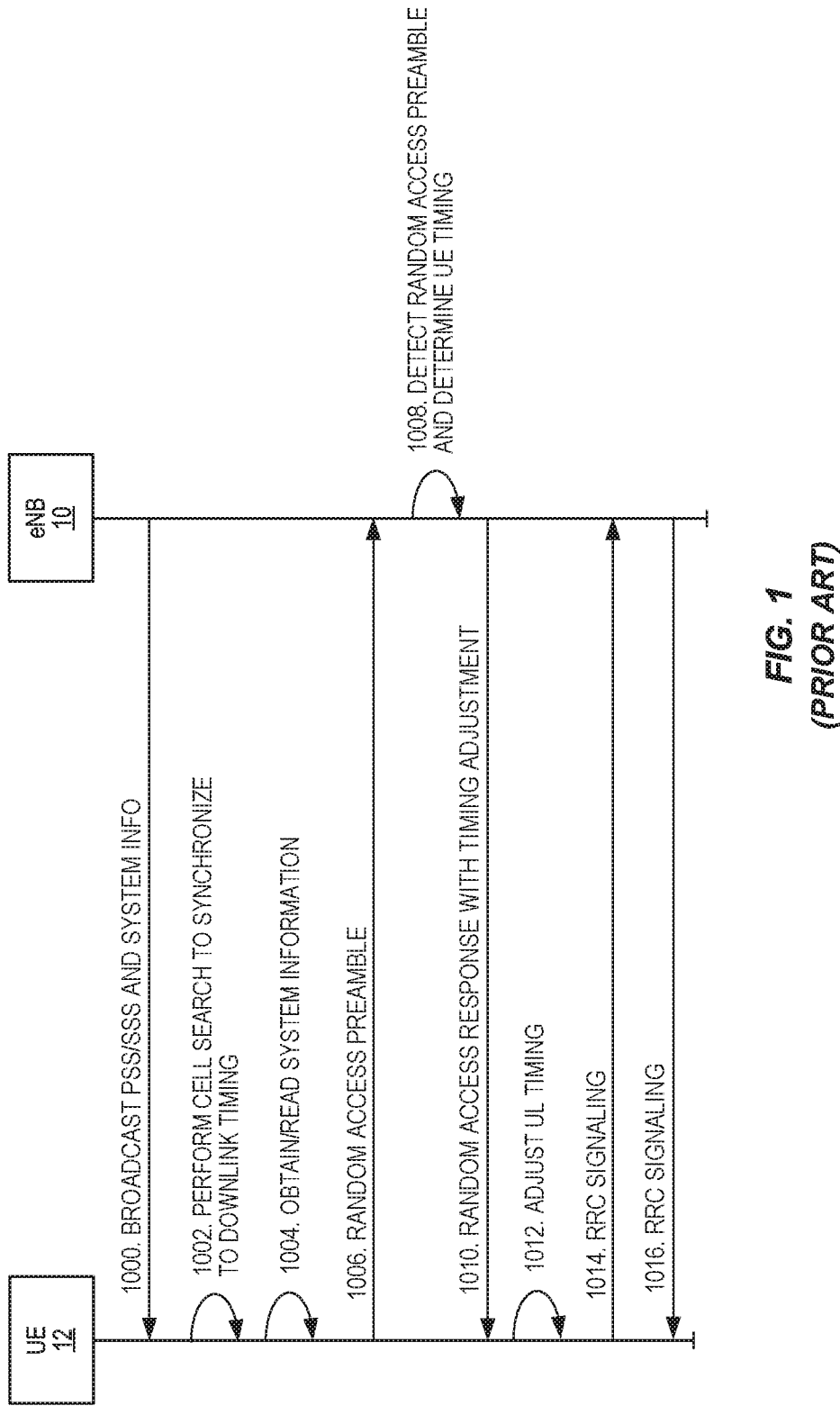
FIG. 1 illustrates a conventional cell search and random access procedure in a $3^{rd}$ Generation Partnership Project (3GPP) Long Term Evolution (LTE) network.
Figure 2:
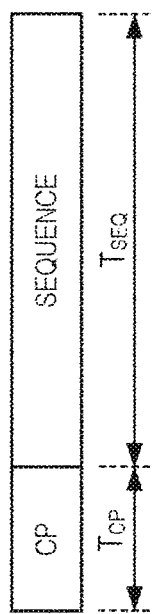
FIG. 2 illustrates a conventional Random Access Channel (RACH) preamble.
Figure 3:
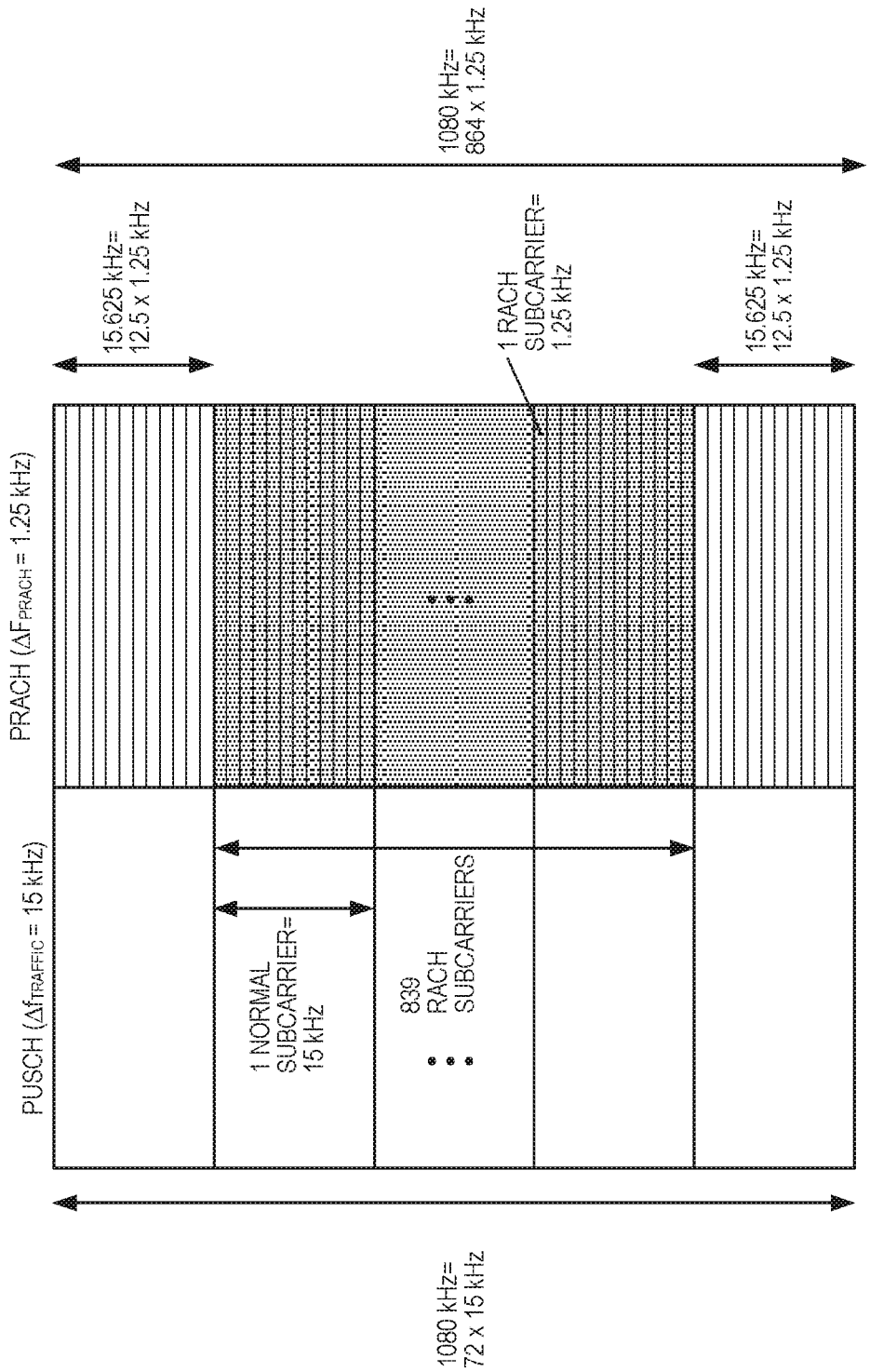
FIG. 3 illustrates subcarrier frequency spacing for conventional Physical Random Access Channel (PRACH) relative to that of other uplink traffic channels.
Figure 4:
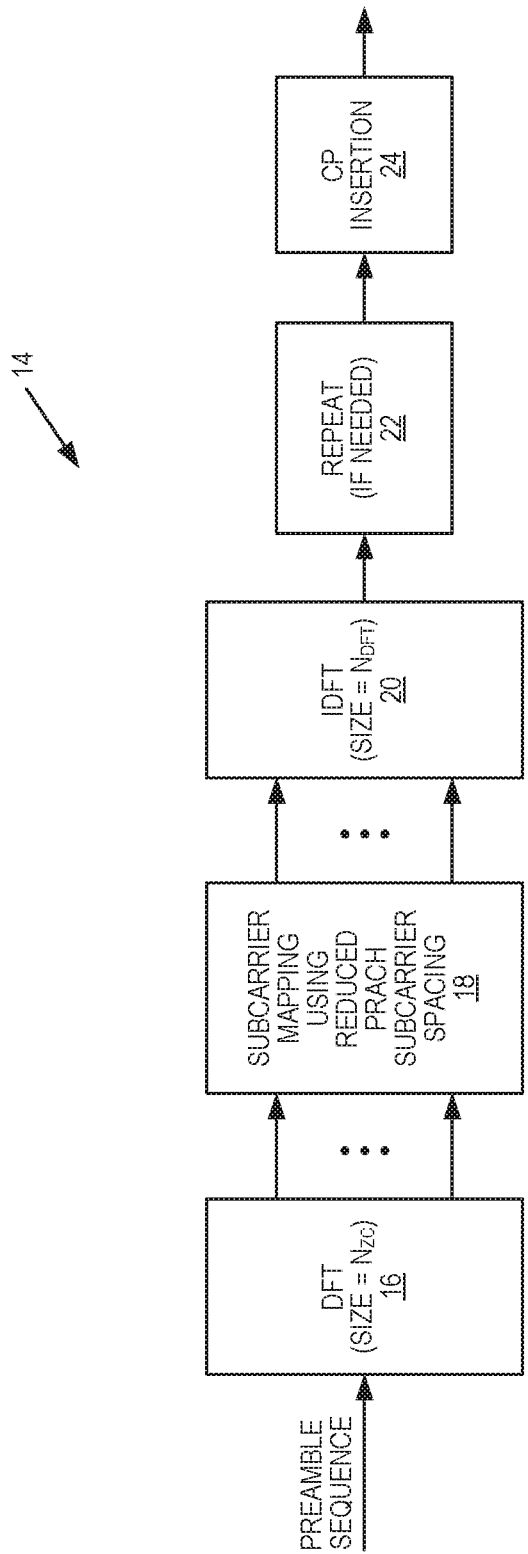
FIG. 4 illustrates a conventional RACH preamble transmitter.
Figure 5:
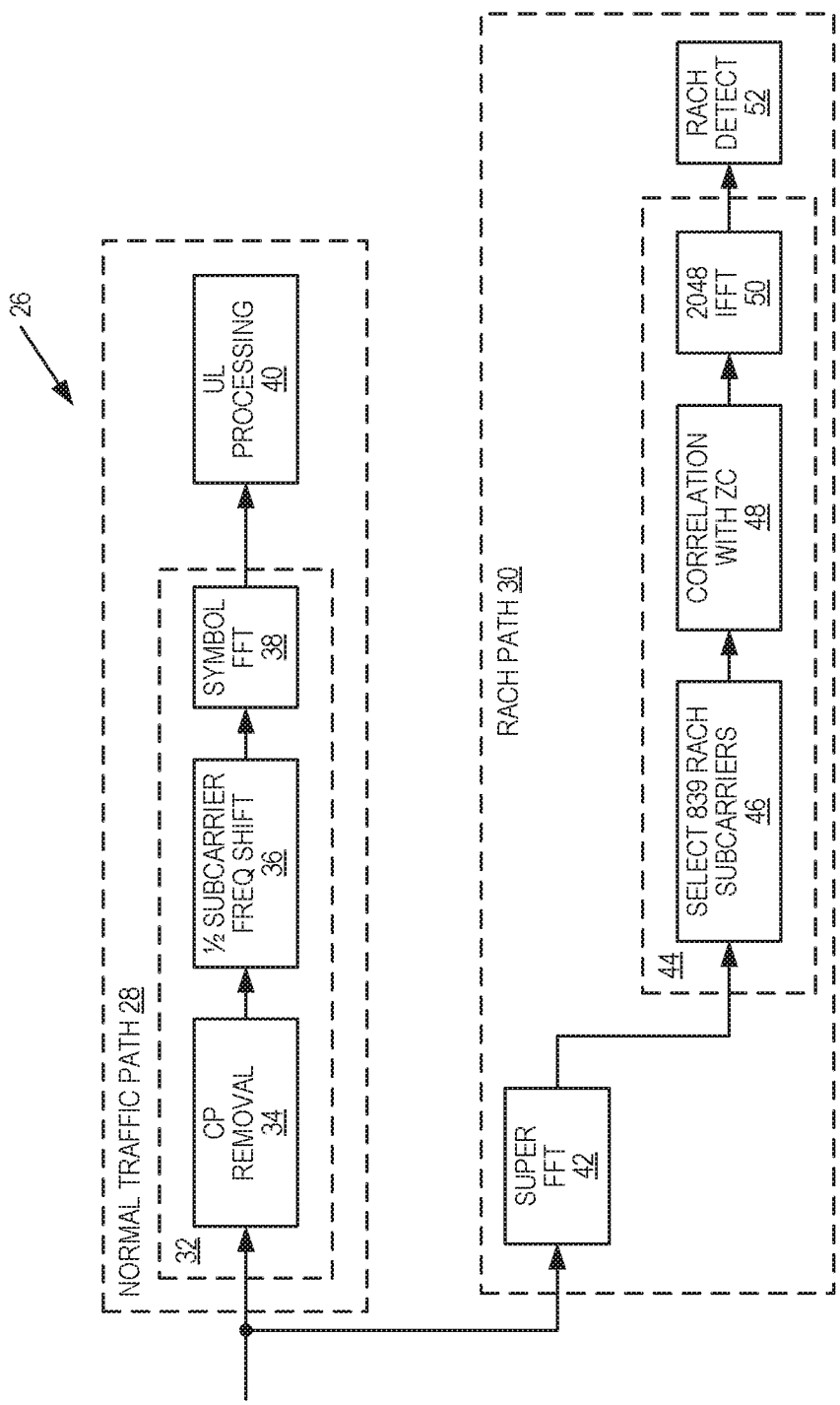
FIG. 5 illustrates an apparatus including a normal uplink traffic processing path and a conventional RACH preamble receiver.
Figure 6:
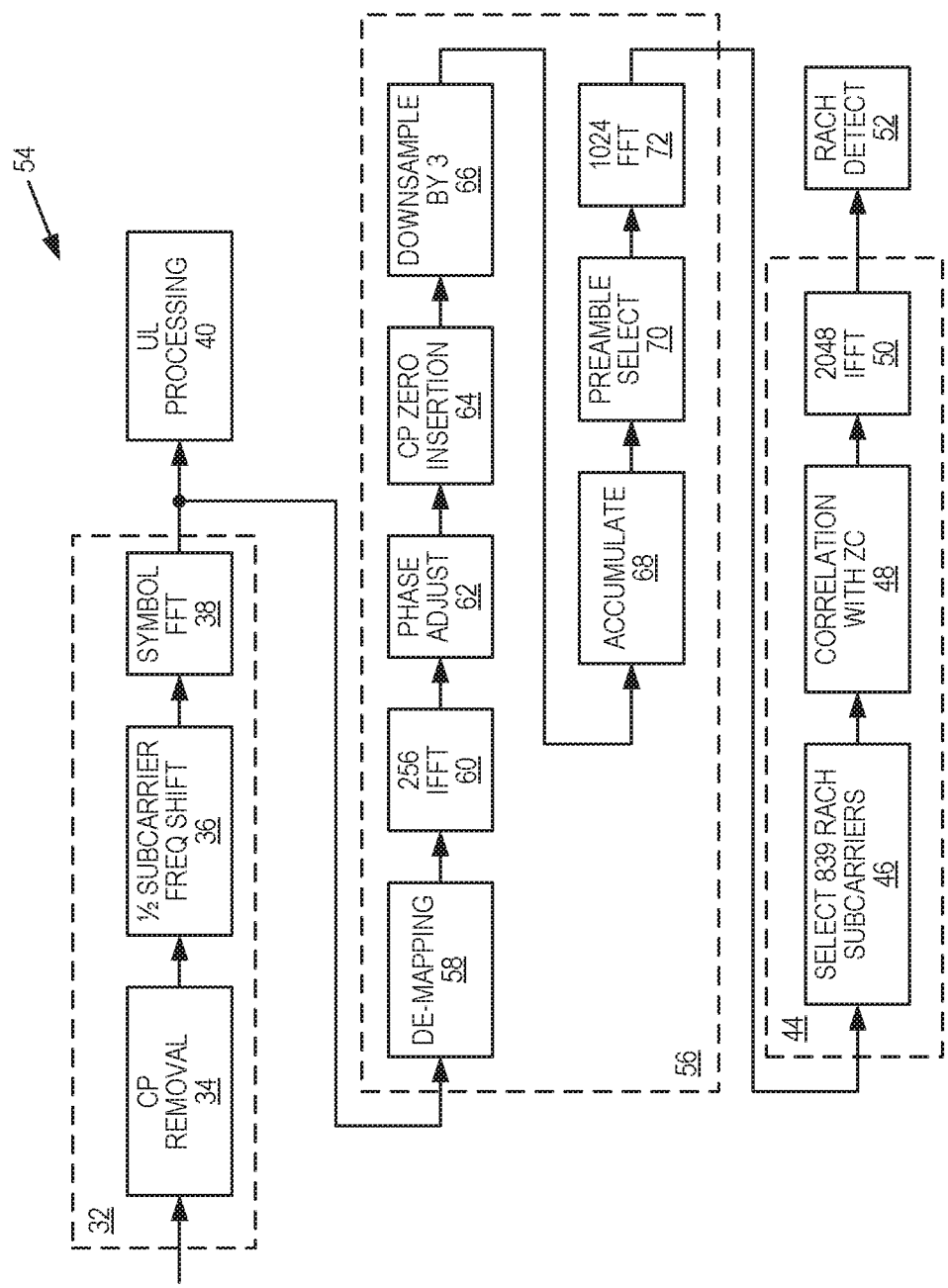
FIG. 6 illustrates an apparatus including a normal uplink traffic processing path and a reduced complexity RACH preamble receiver.

For the SRACH path, the output of the symbol FFT function 104 for a predetermined number of symbols (e.g., 12) is input into the SRACH preamble extraction function 95. The details of the SRACH preamble extraction function 95 are the same as that described above with respect to the device 56 of FIG. 6, but where, in this example, only 71 subcarriers (rather than 839 subcarriers) are utilized. The output symbols of the SRACH preamble extraction function 95 are input into the data processing function 96, one by one. Within the data processing function 96, a SPRACH subcarrier selection function 106 selects the (e.g., 71) outputs of the symbol FFT function 104 that correspond to the used SPRACH subcarriers. A correlation function 108 then correlates the output of the SPRACH subcarrier selection function 106 with known ZC sequences to thereby extract a temporary identifier of the transmitting wireless device 80. An IFFT function 110 then performs a 2,048 point IFFT resulting in a time domain signal that is then processed by the SRACH detection function 98. Notably, the functions 94 and 98 through 110 of FIG. 14 may be implemented in hardware or a combination of hardware and software.

Figure 15:
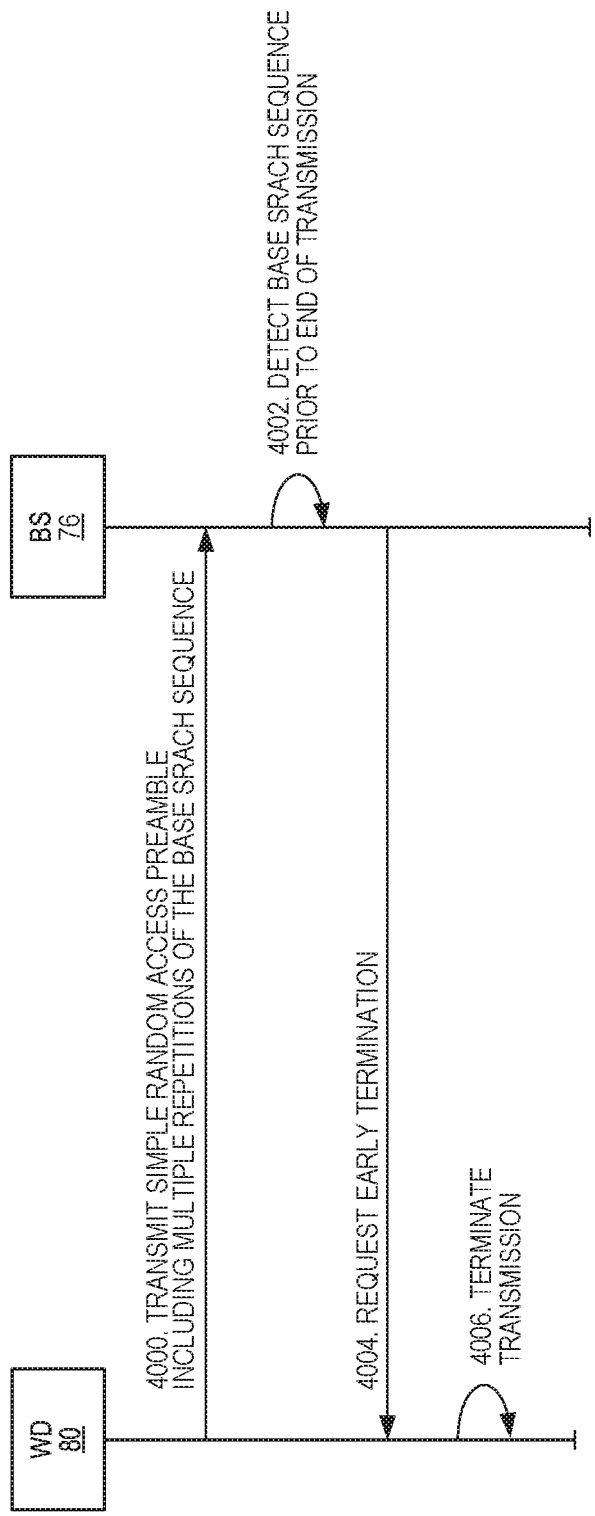
FIG. 15 illustrates an early termination process for terminating transmission of a SRACH preamble according to one embodiment of the present disclosure.

As discussed above, in some embodiments, the base SRACH sequence is repeated Q times to provide the SRACH sequence of the SRACH preamble in order to, e.g., improve sensitivity and time discrimination at the base station 76. However, in some cases, the base station 76 may be able to detect the SRACH preamble before all Q repetitions of the base SRACH sequence are transmitted. In this regard, FIG. 15 illustrates the operation of the base station 76 and the wireless device 80 to provide early termination of the SRACH preamble transmission by the wireless device 80 according to one embodiment of the present disclosure. As illustrated, the wireless device 80 transmits the SRACH preamble (step 4000). During transmission of the SRACH preamble and before all Q repetitions of the base SRACH sequence are transmitted, the base station 76 detects the base SRACH sequence (step 4002). Upon detecting the base SRACH sequence, the base station 76 sends a request to the wireless device 80 for early termination of the transmission of the SRACH preamble (step 4004). In response to the request, the wireless device 80 terminates the transmission of the SRACH preamble before all Q repetitions of the SRACH sequence are transmitted (step 4006).

Figure 16:
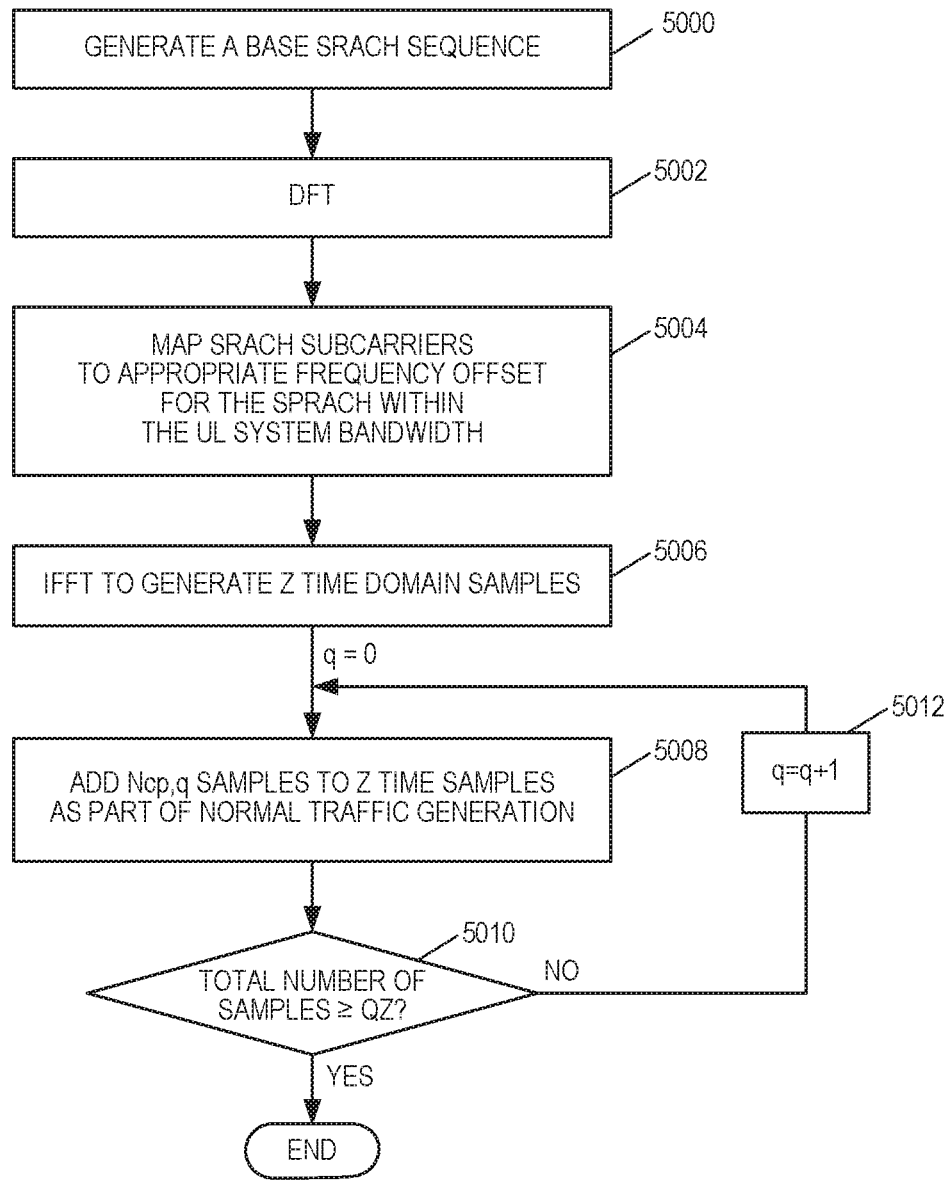
FIG. 16 illustrates a process for generating a SRACH preamble according to another embodiment of the present disclosure.

With regard to repetitions, FIG. 12 above describes a process in which the repetitions of the base SRACH sequence are generated as a continuous signal. FIG. 16 illustrates a process for generating the SRACH preamble in which per symbol traffic processing is used to insert CPs for each repetition of the base SRACH sequence according to another embodiment of the present disclosure. As discussed above, a base SRACH sequence is generated in the time domain (step 5000), and a DFT (e.g., an FFT) is then performed on the time domain base SRACH sequence to thereby transform the time domain base SRACH sequence into a frequency domain representation of the base SRACH sequence (step 5002). The outputs of the DFT, which are the SRACH subcarriers, are then mapped to the appropriate frequency offset for the SPRACH within the uplink (step 5004). After mapping, a Z-point IDFT (e.g., a Z-point IFFT) is performed on the frequency domain samples to thereby transform the frequency domain samples into Z time domain samples (step 5006).

In this embodiment, a CP of $N_{cp,q}$ samples is added to the Z time domain samples (step 5008). $N_{cp,q}$ is the number of samples in the CP for the q-th repetition of the SRACH sequence. Notably, $N_{cp,q}$ may be the same for all repetitions or may be different for different repetitions. Importantly, the CP of $N_{cp,q}$ samples is not part of the CP of the SRACH preamble. Rather, the $N_{cp,q}$ samples are generated in a process equivalent to what is done for normal uplink traffic symbols (e.g., PUSCH symbols) such that the CP of $N_{cp,q}$ samples actually form part of the SRACH sequence of the SRACH preamble. A determination is then made as to whether the total number of time domain samples generated for the SRACH sequence is greater than or equal to Q·Z (step 5010). Q is a value greater than or equal to 1 (i.e., equal to 1 for 1 repetition/instance of the base SRACH sequence or greater than 1 for more than one repetition/instance of the base SRACH sequence). If the total number of time domain samples is not greater than or equal to Q·Z, then a counter q is incremented (step 5012), and the process returns to step 5008 where the SRACH sequence is repeated with the added CP for that repetition. Once the total number of time domain samples is greater than or equal to Q·Z, generation of the SRACH sequence is complete. Notably, the CP of the SRACH preamble is then added to complete the SRACH preamble.

In one embodiment, the time domain SRACH preamble $s(t_s,q)$ is defined as:

$$s(t_s, q) = \beta_{PRACH} + \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{SPRACH}\left(t+\sum_{q=0}^{q} T_{CP,q} - T_{CP}\right)}$$

for $0 \leq q < Q$ and $0 \leq t \leq Q \cdot T_{CYC}$, $T_{CP}$, $\beta_{PRACH}$ is an amplitude scaling factor in order to confirm to the transmit power for the SPRACH ($P_{SPRACH}$) which may be set according to, e.g., existing procedures for setting the power of the conventional PRACH, $x_{u,v}(n)$ is the v-th cyclic shift of the u-th root ZC sequence (as per or similar to 3GPP LTE standards), $\varphi$ is a fixed offset relative to the physical RB boundary in $\Delta f_{SPRACH}$ resolution (e.g., 0 or 1), K is equal to 1 for SRACH, $T_{CP}$ is the total duration of the CP of the SRACH preamble, $T_{CP,q}$ is the duration of the CP of $N_{cp,q}$ samples for the q-th traffic symbol used to generate the SRACH preamble, and $k_0$ is defined as:

$$k_0 = n_{PRB}^{RA} N_{sc}^{RB} - N_{RB}^{UL} N_{sc}^{RB}/2,$$

where the parameter $n_{PRB}^{RA}$ controls the location in the frequency domain, $N_{sc}^{RB}$ is the number of subcarriers per RB, and $N_{RB}^{UL}$ is the number of RBs in the uplink. Further, the u-th root ZC sequence is defined as:

$$x_u(n) = e^{-j\frac{\pi u n(n+1)}{N_{ZC}}},$$

for $0 \leq n \leq N_{ZC}-1$, where u is the ZC physical root sequence index. The SPRACH subcarrier frequency spacing ($\Delta f_{SPRACH}$) is, in one embodiment, equal to some value $\Delta f$ in a non-frequency scaled network (e.g., $\Delta f_{SPRACH} = \Delta f = 15$ kHz in a 3GPP LTE network), where $\Delta f$ is equal to the subcarrier spacing of the other uplink channel(s). In another embodiment, the SRACH subcarrier frequency spacing ($\Delta f_{SPRACH}$) is equal to $X \cdot \Delta f$ in a frequency scaled network (e.g., $\Delta f_{SPRACH} = X \cdot \Delta f = 10 \cdot 15$ kHz$=150$ kHz for a frequency scaled version of a 3GPP LTE network with a scaling factor of 10), where $X \cdot \Delta f$ is the subcarrier spacing of the other uplink channels in the frequency scaled network. Notably, the value K is equal to $\Delta f / \Delta f_{SPRACH} = 1$ for a non-frequency scaled network and equal to $X \cdot \Delta f / \Delta f_{SPRACH} = 1$ for a frequency scaled network. In either case, K=1 such that equality of the subcarrier spacing between the SPRACH and the other uplink channel(s) is achieved. Notably, in the equation for $s(t_s,q)$ above, the additional term $\Sigma_{q=0}^{q} T_{CP,q}$ is a phase shift added to compensate for discontinuity to the blocks of Z time domain samples due to the addition of the CP samples.

FIG. 17 is a block diagram of the base station 76 of FIG. 7 according to one embodiment of the present disclosure. This description is equally applicable to other types of radio access nodes (i.e., nodes in a radio access network of the cellular communications network 74). As illustrated, the base station 76 includes a baseband unit 112 including one or more processor(s) 114, memory 116, and a network interface 118 and a radio unit 120 including a transceiver 122 coupled to one or more antennas 124. In one embodiment, the SRACH processing functionality of the base station 76 described above is implemented at least partially in the baseband unit 112 in the form of software executed by the processor(s) 114 within or associated with the baseband unit 112 or distributed across two or more network nodes (e.g., the baseband unit 112 and another network node). In another example, the processor(s) 114 includes one or more hardware components (e.g., Application Specific Integrated Circuits (ASICs)) that provide some or all of the SRACH processing functionality described above. In another embodiment, the processor(s) 114 includes one or more hardware components (e.g., Central Processing Units (CPUs)), and some or all of the SRACH processing functionality described above is implemented in software stored in, e.g., the memory 116 and executed by the processor 114.

FIG. 18 is a block diagram of the wireless device 80 of FIG. 7 according to one embodiment of the present disclosure. As illustrated, the wireless device 80 includes a processor 126, memory 128, and a transceiver 130 coupled to one or more antennas 132. The processor 126 includes one or more hardware processing components such as, for example, one or more CPUs, one or more ASICs, or the like. In one embodiment, the SRACH processing functionality of the wireless device 80 described above is implemented at least partially in the processor 126. For example, in one embodiment, the processor 126 includes one or more hardware components (e.g., one or more ASICs) that provide some or all of the SRACH processing functionality described above. In another embodiment, the processor 126 includes one or more hardware components (e.g., CPUs or may itself be composed of multiple processors) and some or all of the SRACH processing functionality described above is implemented in software stored in, e.g., the memory 128 and executed by the processor(s) 126.

Systems and methods for SRACH preamble transmission and SRACH sequence reception/detection are disclosed herein. While not being limited to or by any particular benefit or advantage, some non-limiting benefits and advantages of at least some of the embodiments described herein are as follows. As discussed above, the subcarrier frequency spacing of the SPRACH is equal to the subcarrier frequency spacing of the other uplink channels. As a result, the SPRACH subcarriers are orthogonal to the subcarriers of the other uplink channels. This orthogonality to the subcarriers of the other uplink channels provides improved SINR and system performance. In addition, using the same subcarrier frequency spacing as the other uplink channels, rather than smaller subcarrier frequency spacing as in conventional 3GPP LTE RACH, substantially reduces the complexity of SRACH preamble generation at the transmit end and SRACH sequence detection/reception as the receiving end by eliminating the need for the super FFT/IFFT. As another example, software and/or hardware utilized to generate the other uplink channel(s) (e.g., PUSCH) can be used to generate the SPRACH.

The following acronyms are used throughout this disclosure.

3GPP 3$^{rd}$ Generation Partnership Project
4G 4$^{th}$ Generation
5G 5$^{th}$ Generation
ASIC Application Specific Integrated Circuit
CP Cyclic Prefix
CPU Central Processing Unit
DFT Discrete Fourier Transform
DRS Demodulation Reference Signal
eNB Evolved Node B
FFT Fast Fourier Transform
GHz Gigahertz
IDFT Inverse Discrete Fourier Transform
IFFT Inverse Fast Fourier Transform
ISI Inter-Symbol Interference
kHz Kilohertz
km Kilometer
LTE Long Term Evolution
MHz Megahertz
ms Millisecond
Msps Megasamples per Second
OFDM Orthogonal Frequency Division Multiplexing
PRACH Physical Random Access Channel
PSS Primary Synchronization Signal
PUCCH Physical Uplink Control Channel
PUSCH Physical Uplink Shared Channel
RACH Random Access Channel
RB Resource Block
RRC Radio Resource Control
SINR Signal-to-Interference plus Noise Ratio
SPRACH Simple Physical Random Access Channel
SRACH Simple Random Access Channel
SRS Sounding Reference Signal
SSS Secondary Synchronization Signal
UE User Equipment
μs Microsecond
ZC Zadoff-Chu Those skilled in the art will recognize improvements and modifications to the embodiments of the present disclosure. All such improvements and modifications are considered within the scope of the concepts disclosed herein and the claims that follow.

What is claimed is:
1. A method of operation of a wireless device to perform random access in a cellular communications network, comprising:
   generating a base random access sequence having a length that is less than or equal to a number of subcarriers in a physical random access channel;

transforming the base random access sequence from the time domain to the frequency domain to thereby provide a frequency domain representation of the base random access sequence;
mapping the frequency domain representation of the base random access sequence to an appropriate frequency offset for the physical random access channel within a system bandwidth of an uplink from the wireless device to a radio access node in the cellular communications network to thereby provide a mapped frequency domain representation of the base random access sequence; and
transforming the mapped frequency domain representation of the base random access sequence from the frequency domain to the time domain to thereby provide Z samples of a random access sequence for a random access preamble for one symbol period of the physical random access channel;
transmitting the random access preamble on the physical random access channel in the uplink from the wireless device to the radio access node in the cellular communications network, the physical random access channel comprising a plurality of subcarriers having a subcarrier frequency spacing that is equal to a subcarrier frequency spacing in one or more other channels of the uplink; and
in response to transmitting the random access preamble, receiving a random access response from the radio access node.

2. The method of claim 1 wherein the cellular communications network is a Long Term Evolution, LTE, cellular communications network.

3. The method of claim 1 wherein the one or more other channels of the uplink comprise a physical uplink shared channel.

4. The method of claim 1 wherein the subcarrier frequency spacing of both the plurality of subcarriers in the physical random access channel and subcarriers in the one or more other channels of the uplink is 15 kilohertz.

5. The method of claim 1 wherein the subcarrier frequency spacing of both the plurality of subcarriers in the physical random access channel and subcarriers in the one or more other channels of the uplink is X·15 kilohertz, where X>1.

6. The method of claim 1 wherein transmitting the random access preamble further comprises repeating the Z samples of the random access sequence for the random access preamble for one or more additional symbol periods of the physical random access channel.

7. The method of claim 1 wherein:
the number of samples Z of the random access sequence for the random access preamble is defined as the product of a time duration of the base random access sequence and a system sample rate that is a function of the system bandwidth of the uplink; and
transmitting the random access preamble further comprises repeating the Z samples of the random access sequence for the random access preamble Q symbol periods of the physical random access channel, where Q is greater than or equal to 2.

8. The method of claim 1 wherein transmitting the random access preamble further comprises:
inserting a number of cyclic prefix samples at a start of the Z samples of the random access sequence for the random access preamble for the one symbol period of the physical random access channel, the number of cyclic prefix samples being part of the random access sequence of the random access preamble rather than a cyclic prefix for the random access preamble;
repeating the Z samples of the random access sequence for the random access preamble for a second symbol period of the physical random access channel; and
inserting a number of cyclic prefix samples at a start of the Z samples of the random access sequence for the random access preamble for the second symbol period of the physical random access channel.

9. The method of claim 6 further comprising, while transmitting the random access preamble:
receiving a request from the radio access node for early termination of transmission of the random access preamble; and
in response to receiving the request, terminating transmission of the random access preamble.

10. The method of claim 1 wherein a bandwidth of the physical random access channel is 1.08 Megahertz, the subcarrier frequency spacing of both the plurality of subcarriers in the physical random access channel and the subcarriers in the one or more other channels of the uplink is 15 kilohertz, and the length of the random access sequence is less than or equal to 72.

11. The method of claim 10 wherein the base random access sequence is a Zadoff-Chu sequence, and the length of the random access sequence is 71.

12. The method of claim 1 wherein a bandwidth of the physical random access channel is X·1.08 Megahertz, the subcarrier frequency spacing of both the plurality of subcarriers in the physical random access channel and the subcarriers in the one or more other channels of the uplink is X·15 kilohertz, and the length of the base random access sequence is less than or equal to 72, where X>1.

13. The method of claim 12 wherein the base random access sequence is a Zadoff-Chu sequence, and the length of the base random access sequence is 71.

14. The method of claim 1 wherein a bandwidth of the physical random access channel is X·M·15 kilohertz, the subcarrier frequency spacing of both the plurality of subcarriers in the physical random access channel and the subcarriers in the one or more other channels of the uplink is X·15 kilohertz, and the length of the base random access sequence is less than or equal to M, where X>1.

15. The method of claim 14 wherein the base random access sequence is a Zadoff-Chu sequence, and the length of the base random access sequence is a largest prime number less than or equal to M.

16. A wireless device, comprising:
a transceiver; and
a processor associated with the transceiver and configured to:
generate a base random access sequence having a length that is less than or equal to the number of subcarriers in a physical random access channel;
transform the base random access sequence from the time domain to the frequency domain to thereby provide a frequency domain representation of the base random access sequence;
map the frequency domain representation of the base random access sequence to an appropriate frequency offset for the physical random access channel within a system bandwidth of an uplink from the wireless device to a radio access node in a cellular communications network to thereby provide a mapped frequency domain representation of the base random access sequence;

transform the mapped frequency domain representation of the base random access sequence from the frequency domain to the time domain to thereby provide samples of a random access sequence of the random access preamble for one symbol period of the physical random access channel transmit, via the transceiver, a random access preamble on the physical random access channel in the uplink from the wireless device to the radio access node in the cellular communications network, the physical random access channel comprising a plurality of subcarriers having a subcarrier frequency spacing that is equal to a subcarrier frequency spacing in one or more other channels of the uplink; and receive, via the transceiver, a random access response from the radio access node in response to transmitting the random access preamble.

17. The wireless device of claim 16 wherein the cellular communications network is a Long Term Evolution, LTE, cellular communications network.

18. The wireless device of claim 16 wherein the subcarrier frequency spacing of both the plurality of subcarriers in the physical random access channel and subcarriers in the one or more other channels of the uplink is 15 kilohertz.

19. The wireless device of claim 16 wherein the subcarrier frequency spacing of both the plurality of subcarriers in the physical random access channel and subcarriers in the one or more other channels of the uplink is X·15 kilohertz, where X>1.

20. The wireless device of claim 16 wherein transmitting the random access preamble further comprises repeating the samples of the random access sequence of the random access preamble for one or more additional symbol periods of the physical random access channel.

21. The wireless device of claim 20 wherein the processor is further configured to, while transmitting the random access preamble:

receive, via the transceiver, a request from the radio access node for early termination of transmission of the random access preamble; and terminate transmission of the random access preamble in response to receiving the request.

22. The wireless device of claim 16 wherein a bandwidth of the physical random access channel is 1.08 Megahertz, the subcarrier frequency spacing of both the plurality of subcarriers in the physical random access channel and the subcarriers in the one or more other channels of the uplink is 15 kilohertz, and the length of the base random access sequence is less than or equal to 72.

23. The wireless device of claim 16 wherein a bandwidth of the physical random access channel is X·1.08 Megahertz, the subcarrier frequency spacing of both the plurality of subcarriers in the physical random access channel and the subcarriers in the one or more other channels of the uplink is X·15 kilohertz, and the length of the base random access sequence is less than or equal to 72, where X>1.

* * * * *

UNITED STATES PATENT AND TRADEMARK OFFICE
CERTIFICATE OF CORRECTION

PATENT NO. : 10,244,562 B2
APPLICATION NO. : 15/502382
DATED : March 26, 2019
INVENTOR(S) : McGowan et al.

Page 1 of 1

It is certified that error appears in the above-identified patent and that said Letters Patent is hereby corrected as shown below:

In the Specification

In Column 5, Line 11, delete "Program (3GPP)" and insert -- Project (3GPP) --, therefor.

In Column 8, Lines 15, delete "Program (3GPP)" and insert -- Project (3GPP) --, therefor.

In Column 18, Line 10, delete "as the receiving" and insert -- at the receiving --, therefor.

In the Claims

In Column 21, Line 6, in Claim 16, delete "channel" and insert -- channel; --, therefor.

Signed and Sealed this
Thirtieth Day of July, 2019

Andrei Iancu
*Director of the United States Patent and Trademark Office*